United States Patent [19]
Ohtsuka et al.

[11] Patent Number: 5,590,096
[45] Date of Patent: Dec. 31, 1996

[54] REWRITABLE STORAGE APPARATUS USING FIRST AND SECOND BIAS MAGNETIC FIELDS

[75] Inventors: Masaoki Ohtsuka, Kawasaki; Teruji Yamakawa, Yokohama; Tetsuo Maruyama, Hyogo, all of Japan

[73] Assignee: Fujitsu Limited, Japan

[21] Appl. No.: 341,743

[22] Filed: Nov. 18, 1994

[30] Foreign Application Priority Data

Jan. 31, 1994 [JP] Japan .................................. 6-009423

[51] Int. Cl.⁶ .................................................. G11B 11/00
[52] U.S. Cl. ............................................. 369/13; 360/114
[58] Field of Search ........................... 369/13, 110, 75.2, 369/75.1, 77.2, 77.1, 78, 79; 360/102, 103, 114, 59, 46

[56] References Cited

U.S. PATENT DOCUMENTS

| | | | |
|---|---|---|---|
| 5,291,345 | 3/1994 | Umeda et al. | 369/13 |
| 5,317,548 | 5/1994 | Matsuda et al. | 369/13 |
| 5,327,417 | 7/1994 | Tanaka et al. | 369/13 |
| 5,345,431 | 9/1994 | Oliver et al. | 369/13 |
| 5,351,221 | 9/1994 | Ohno | 369/13 |
| 5,367,508 | 11/1994 | Haba | 369/13 |

FOREIGN PATENT DOCUMENTS

| | | |
|---|---|---|
| 62-264464 | 11/1987 | Japan . |
| 63-266602 | 11/1988 | Japan . |
| 2-208847 | 8/1990 | Japan . |
| 5-73807 | 3/1993 | Japan . |

*Primary Examiner*—Tan Dinh
*Attorney, Agent, or Firm*—Greer, Burns & Crain, Ltd.

[57] ABSTRACT

The speed of a write operation in an optical magnetic disk unit is improved by effectively setting the bias magnetic field. When new data is written in an area on a medium, a bias control method for a rewritable storage apparatus which records data by applying a bias magnetic field for data recording and erases recorded data by applying a bias magnetic field for data erasing, applies the bias magnetic field for data erasing to the area to perform an erase operation; applies the bias magnetic field for writing to the area to perform a record operation to record the new data; and applies and maintains the bias magnetic field for data erasing to the medium directly after the record operation is finished.

14 Claims, 22 Drawing Sheets

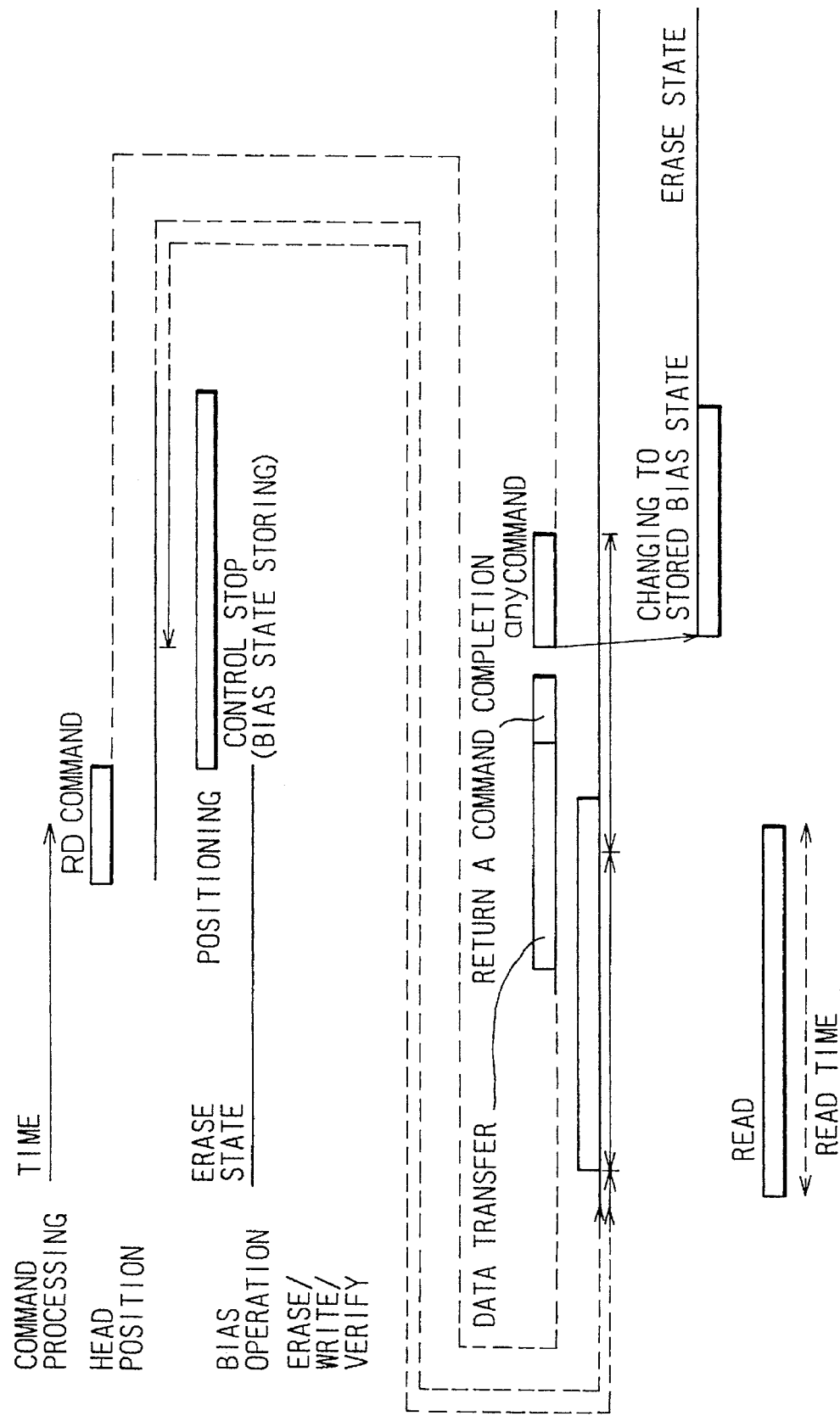

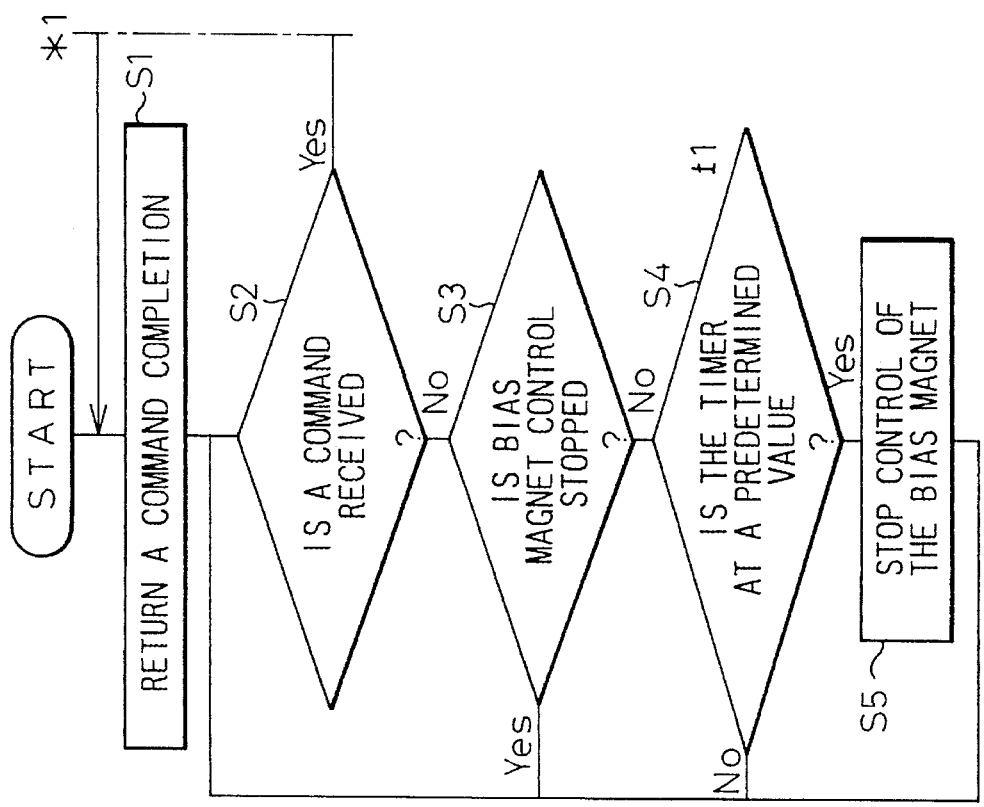

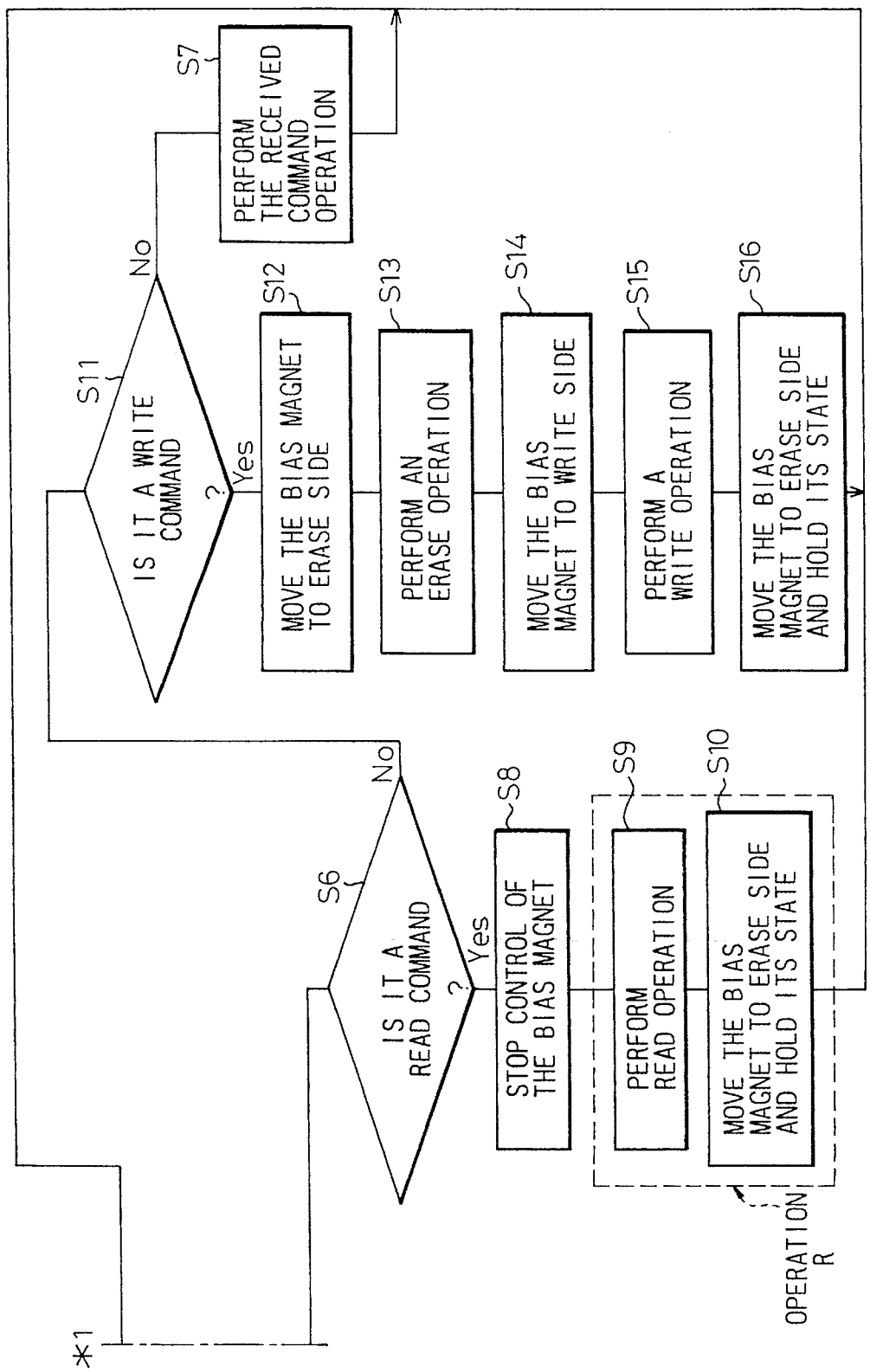

REWRITABLE STORAGE APPARATUS USING FIRST AND SECOND BIAS MAGNETIC FIELDS

BACKGROUND OF THE INVENTION (1) Field of the Invention

The present invention relates to an erasable storage apparatus, such as an optical magnetic disk unit in which a bias magnetic field is switched between an erase state and a record state, and a bias control method therefor. Further, the present invention can be applied to apparatuses which use recording media in the form disks, cards and tapes. Storage units according to the present invention are connected to host computers such as personal computers and so forth.

For example, there are three types of optical disks. The first type is a read-only type in which data is previously recorded during production and no data can be recorded thereafter. The second type is a one-time recording type in which data cannot be erased from disk. The third type is a rewritable type in which data can be erased and new data can be recorded in the same area. The present invention particularly relates to an optical magnetic disk apparatus which uses an optical magnetic disk of the third type. In the specification, a data reproduction operation may be called a data read operation, and a data record operation may be called a data write operation.

(2) Description of the Related Art

In a rewritable optical magnetic disk apparatus, when data is written or erased, a bias magnetic field is applied and laser light is projected onto the optical magnetic disk at the same time. When data is read, only laser light projection is performed. A bias magnetic field perpendicular to the surface of the medium is applied when data is written, and a bias magnetic field perpendicular to the surface of the medium but with a reverse polarity to that of the field used when data is written, is applied when data is erased.

When a data rewrite operation is performed, a data erase operation is performed on areas of the medium on which new data is to be written before the data is written, then, data is written in the areas. Further, it is verified that data is correctly written. Namely, in the data rewrite operation, it is necessary to sequentially perform an erase operation, a write operation and a verify operation. Therefore, the above-mentioned switching of the bias magnetic field is always performed when data is rewritten.

However, this switching of the bias magnetic field requires a relatively long time. The time necessary to establish a new bias magnetic field may be called a bias-set-up time.

In the optical magnetic disk apparatus, rewrite operations are carried out in units of sectors or of blocks, therefore, the polarity of the bias magnet is frequently changed during a rewrite operation. Therefore, there occur problems due to the bias set up time.

For example, when the optical magnetic disk apparatus receives write data from a host computer, the time necessary to transfer the write data to a buffer memory of the apparatus is very short relative to a total time for the write operation. Further, when data is written into continuous areas, a seek time to place the head to a target position on the disk is also short because the distance the head is moved is short. In this way, the bias-set-up operation is the longest operation in the data rewrite operation. Further, the bias-set-up time is constant regardless of the position of the head.

When data is rewritten, the head seek operation head and the switching of the bias magnet to the erase state start simultaneously. After the head moves to a target position, the erase operation, the write operation and the verify operation are sequentially carried out. However, since the bias-set-up time is long, a problem occurs that although the head is already at the target position, the erase operation cannot start because the bias magnetic field is not yet set up in the erase state. If the bias-set-up operation is finished directly after the target position passes under the head, the erase operation must wait until the target position passes under the head again.

Namely, in the conventional optical magnetic apparatus, the bias-set-up time determines the access time for the rewrite operation, and the time for the rewrite operation is increased due to the bias-set-up time.

In recent years, the speed of the spindle motor which rotates the optical magnetic disk has increased in order to improve the access time and the slow access time due to the bias-set-up time has become a serious problem.

SUMMARY OF THE INVENTION

An object of the present invention is to improve the speed of the write operation by effectively setting up the bias magnetic field in a rewritable storage apparatus.

In the rewritable storage apparatus or the bias control method according to the present invention, when new data is recorded in an area on a medium, an erase operation to erase old data recorded in the area is performed by applying a second bias magnetic field to the area, then, a record operation to record the new data is performed by applying a first bias magnetic field to the area. Further, the second bias magnetic field for data erasing is applied to the medium directly after the record operation is finished, and remains in its state.

In the rewritable storage apparatus, only write operations to virgin areas on the medium require no erase operations. Therefore, after a certain amount of data is written in the medium, every write operation becomes a rewrite operation. According to the present invention, the stand-by bias magnetic field is the erase state, therefore, the erase operation can promptly start without switching the bias magnetic field to the erase state when the rewrite operation is performed. Consequently, the above-mentioned problems due to the bias set up time are reduced.

However, electrical power is consumed in order to maintain the erase field. Therefore, the application of the erase bias magnetic field may be stopped when no command is received for a predetermined time duration or when a read command is received. By this method, power consumption is reduced.

BRIEF DESCRIPTION OF THE DRAWINGS

The present invention will be more clearly understood from the description as set forth below with reference to the accompanying drawings, wherein:

FIGS. 15 to 20 are time-charts showing a plurality of examples of bias control methods;

FIGS. 21A and 21B are a flow-chart showing operations common to the examples of bias control methods;

DESCRIPTION OF THE PREFERRED EMBODIMENTS

Figure 1:
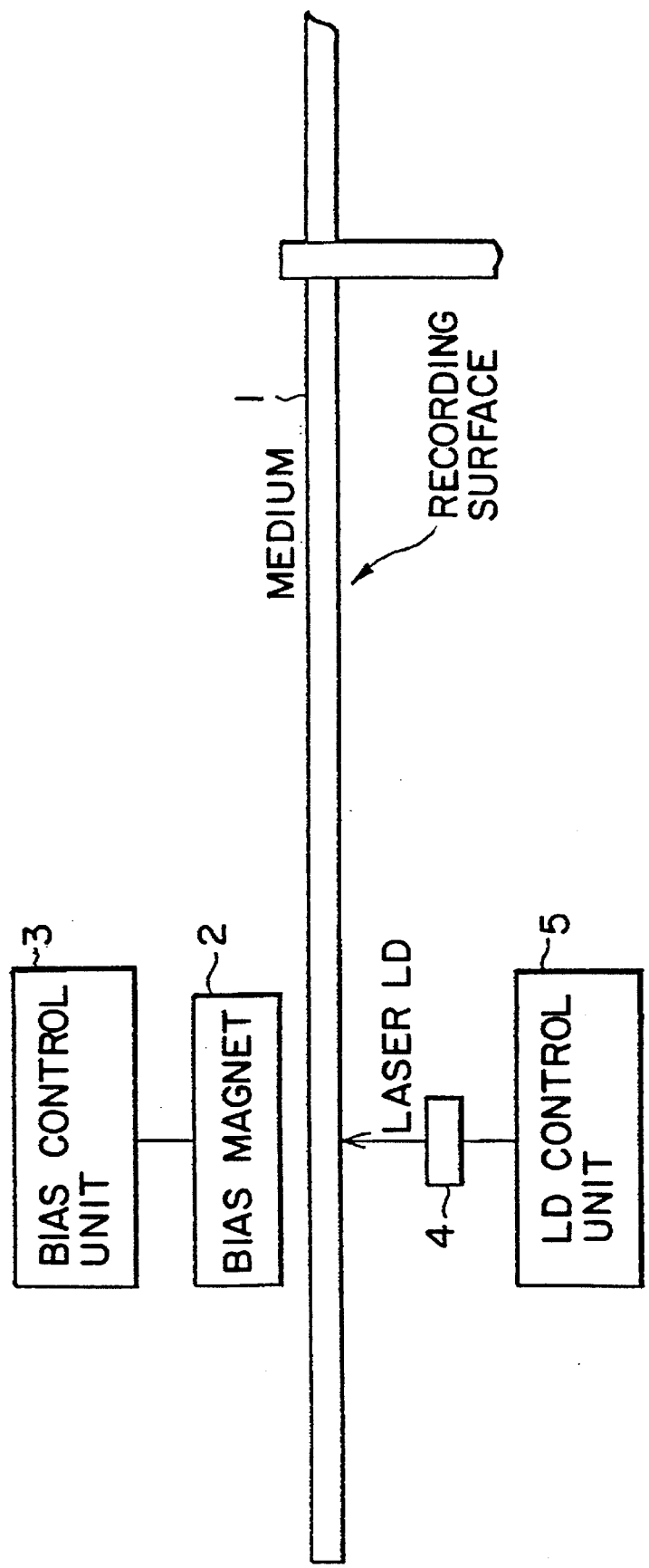
FIG. 1 is an explanatory diagram concerning an optical magnetic disk unit.

Before proceeding to a detailed description of the preferred embodiments of the present invention, a conventional disk unit will be described below to allow a clearer understanding of the differences between the present invention and the prior art.

The present invention can be applied to a rewritable storage apparatus using a bias magnetic field. An optical magnetic disk unit is used for explaining the present invention. Further, examples in which permanent magnets are used to realize the bias magnet are mainly explained.

The optical magnetic disk is a rewritable medium. Namely, in the optical magnetic disk apparatus, data can be written onto and read or erased from the optical magnetic disk. The writing, reading and erasing use the Curie-point recording method and are respectively carried out in the following manners.

The coercive force of a ferromagnetic material generally decreases according to an increase in temperature and when the temperature increases to the Curie-point, the coercive force becomes zero. This means that the ferromagnetic material is paramagnetic at or above the Curie-point. When the temperature of an area on the optical magnetic disk (medium) is increased by projecting laser light and a bias magnetic field is externally applied, the area illuminated by the laser light is magnetized in the same direction as the bias magnetic field because the temperature of the area is about the Curie-point. The magnetising direction of the area is maintained when the temperature of the area falls when the laser light is turned off.

The laser light projected onto the medium has a spot-like shape. The area on the medium illuminated by the laser light is called a pit. Data is stored as the magnetising directions of the pits.

All pits initially have same magnetising directions, for example, the magnetising directions corresponding to data "1". When data is written, the bias magnetic field is set to a state corresponding to data "0". The laser light is projected onto pits where data "0" is to be written. No laser light is projected to pits where data "1" is to be written. Namely, the magnetising directions of the pits to which data "1" is written do not change.

When data is read, laser light having less power than that for writing is projected, namely, laser light not powerful enough to increase the temperature of the pits to the Curie-point is projected. The polarization of the laser light reflected from the pit changes according to the magnetising direction of the pit, therefore, read data is determined by detecting a difference in the polarization of the laser light. When data is read, the application of the bias magnetic field is unnecessary, but the bias magnetic field may be applied because it does not influence the data read operation or data written on the medium.

When data is erased, a bias magnetic field corresponding to the initial magnetising direction is applied and laser light whose power is same as that for writing is applied to all pits. In this way, the magnetising directions of all erased pits is the same.

The following table shows above-mentioned conditions of the bias magnetic field and the laser light power for reading, writing and erasing.

|  | BIAS MAGNETIC FIELD | LD POWER |
| --- | --- | --- |
| READING | NOT NECESSARY | LOW |
| WRITING | POLARITY FOR WRITING | HIGH |
| ERASING | POLARITY FOR ERASING | HIGH |

FIG. 1 is a diagram for explaining a principle of an optical magnetic disk unit.

In FIG. 1, reference numeral 1 indicates an optical magnetic disk (medium); 2 indicates a bias magnet; 3 indicates a bias control unit; 4 indicates a laser diode (LD); and 5 indicates a laser diode (LD) control unit for the laser diode 2.

A laser beam output from the laser diode 4 is projected onto the optical magnetic disk 1 through a lens system which is not shown. The lens system focuses the laser beam into a very small spot on the optical magnetic disk 1. The LD control unit 5 controls the LD 4 as follows; when data is read, the LD 4 outputs a low power beam; when data is written, the LD 4 outputs a high power beam or outputs no beam according to write data; and when data is erased, the LD 4 outputs a high power beam continuously.

The bias magnet 2 is a permanent magnet or an electromagnet. When a permanent magnet is used, the polarity of the bias magnet field is switched by physically changing the position of the permanent magnet. When the electromagnet is used, the polarity of the bias magnet field is switched by changing the direction of current flowing through the electromagnet. The bias control unit 3 controls the bias magnet 2 as follows: when data is written, the bias magnet 2 generates the bias magnetic field for writing on the pit; and when data is erased, the bias magnet 2 generates a reverse bias magnetic field for erasing on the pit.

In this way, the conditions shown in the above table are realized.

In the optical magnetic disk unit, when new data is written on pits on which old data was previously written, an erase operation is carried out on those pits, then new data is written on the pits, and the data is verified by reading the data. Namely, when data is rewritten, three operations erasing, writing and verifying (reading) are necessary. The polarity of the bias magnetic field is switched to that for erasing during the erase operation and is switched to that for writing during the write operation. As described above, the bias magnetic field is unnecessary during a read operation, but it may still exist.

In the conventional optical magnetic disk unit in which a permanent magnet is used as a bias magnet, the permanent magnet moves to an intermediate position between those for writing and erasing when the verify operation starts and is kept in this position during the verify operation, or the permanent magnet is kept in a position for writing because the write operation is carried out immediately before the verify operation. In this way, the polarity of the bias magnetic field is changed by moving the permanent magnet. Therefore, the bias-set-up time, needed to change the polarity of the bias magnetic field, is determined by the time to move the permanent magnet.

In the conventional optical magnetic disk unit in which an electromagnet is used as a bias magnet, the current through the electromagnet is cut off during the verify operation, namely, no bias magnetic field is applied, or the polarity for writing is maintained during the verify operation. Therefore, the bias-set-up time, needed to change the polarity of the bias magnetic field, is determined by the inductance of the electromagnet.

As described above, the bias-set-up time is relatively long, therefore, the speed of the rewrite operation is decreased.

Figure 2:
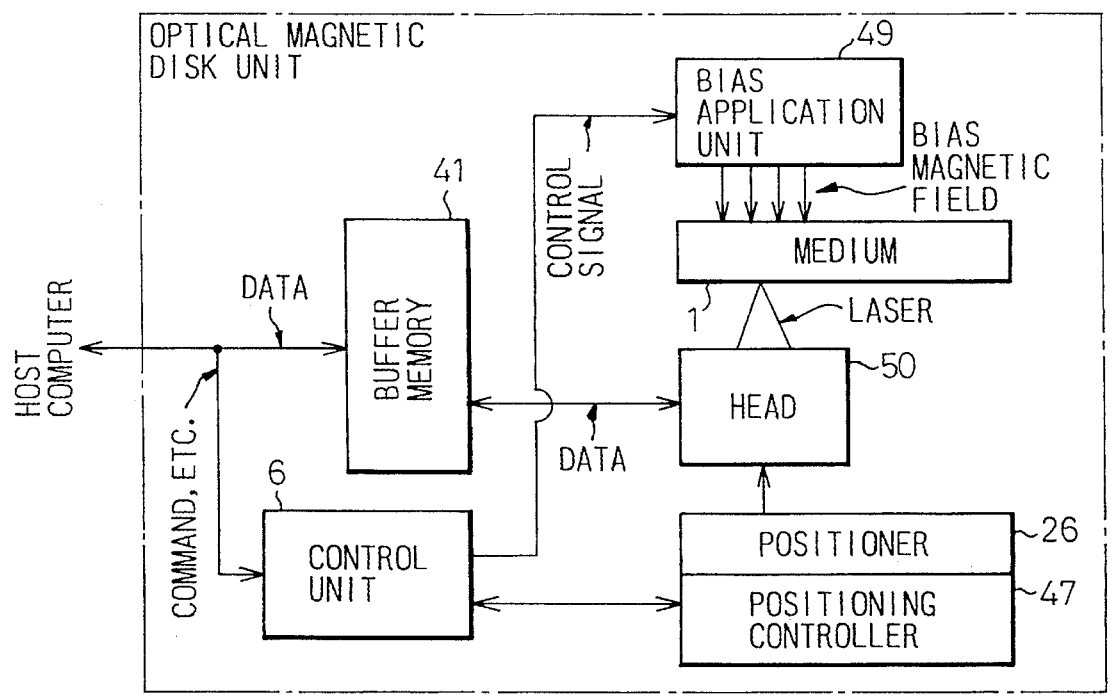
FIG. 2 is a block diagram for explaining a principle of the present invention.
Figure 3:
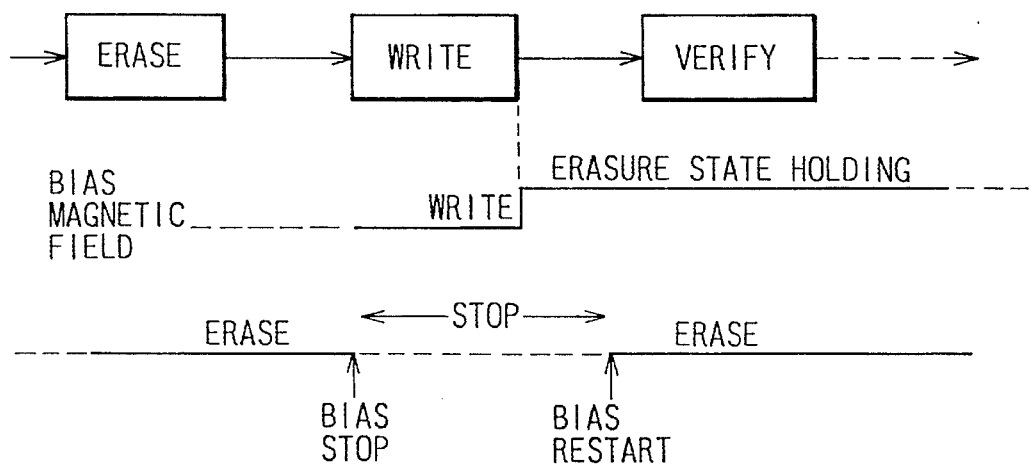
FIG. 3 is a time-chart for explaining a principle of the present invention.

FIGS. 2 and 3 are diagrams for explaining a principle of the present invention. FIG. 2 shows a fundamental constitution of an optical magnetic disk unit according to the present invention, and FIG. 3 shows a sequence of the unit shown in FIG. 2.

In FIG. 2, reference numeral 1 indicates an optical magnetic disk (medium); 6 indicates a control unit; 26 indicates a positioner; 41 indicates a buffer memory; 47 indicates a position control unit; 49 indicates a bias application unit; and 50 indicates a head.

The buffer memory 41 temporarily stores data transferred from or to a host computer. The positioner 26 moves the head 50, and the position control unit 47 controls the positioner 26 so that the head 50 moves to a target position. The bias application unit 49 applies a bias magnetic field to an area on the optical magnetic disk to which a laser beam spot is projected from the head 50. The bias magnetic field is switched between two different polarities.

As shown in FIG. 3, when new data is to be recorded in an area on a medium, an erase operation to erase data recorded in the area is performed, then, a write operation to write the new data is performed. Further, the bias magnetic field for data erasing is applied to the medium directly after the record operation is finished, and this state is maintained.

In the optical magnetic disk unit shown in FIGS. 2 and 3, the erase operation can start, without switching the bias magnetic field to the erase state, immediately after the rewrite operation is performed.

In the following, an embodiment in which the present invention is applied to an optical magnetic disk unit will be explained. This unit is connected to a host computer.

The mechanical constitution of the optical magnetic disk unit is explained with reference to FIGS. 4 to 10.

Figure 4:
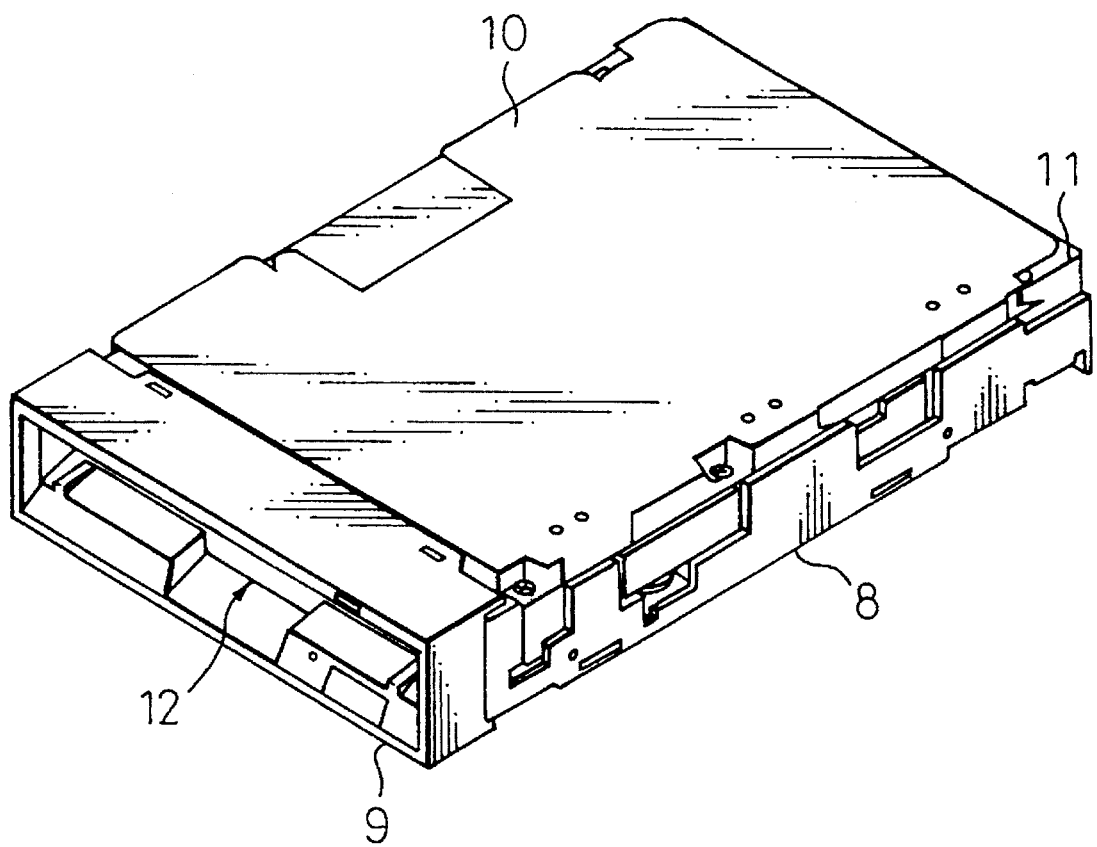
FIG. 4 is a perspective view of an optical magnetic disk unit of an embodiment from front upper side.
Figure 5:
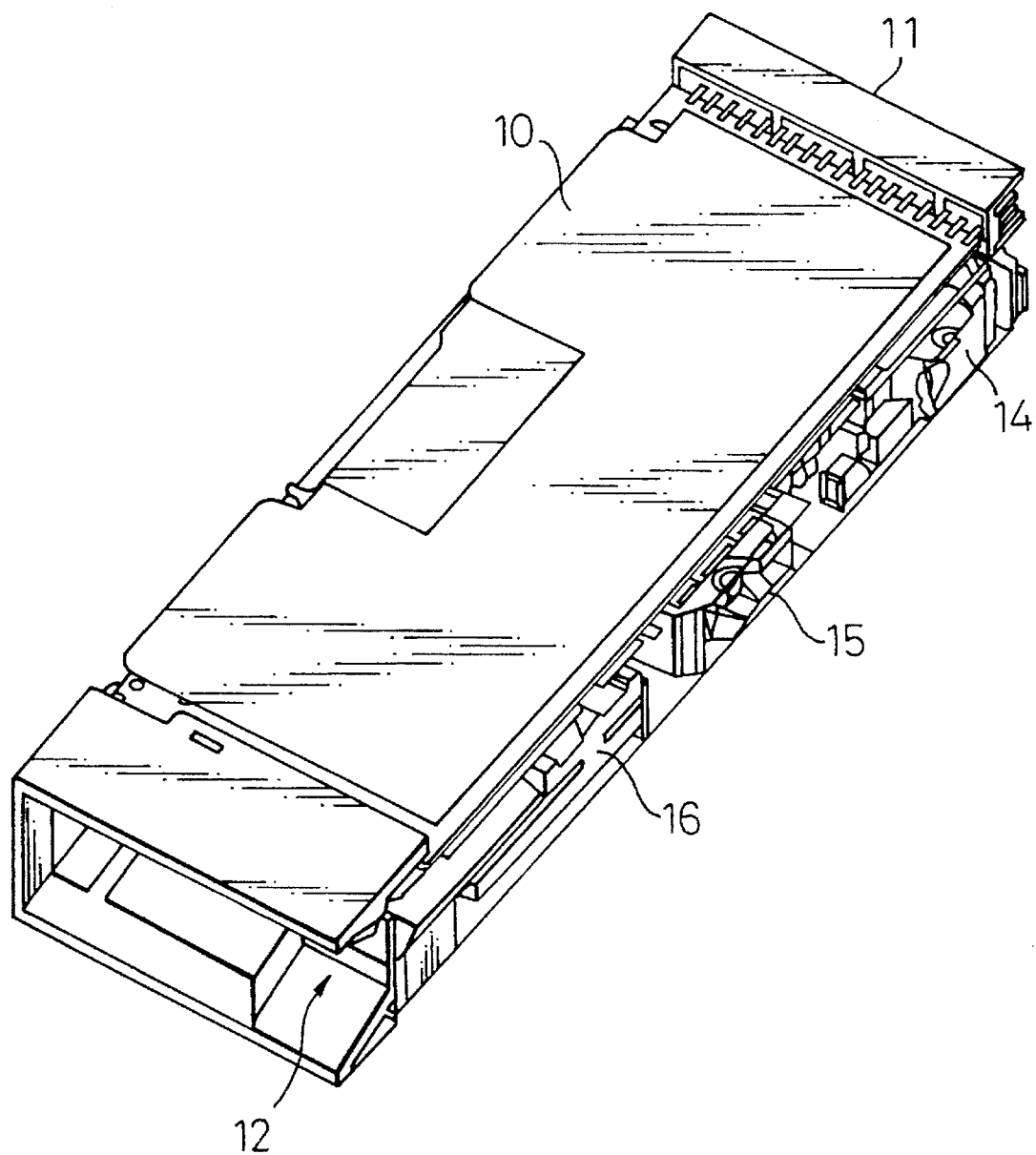
FIG. 5 is a perspective view of an optical magnetic disk unit of the embodiment when the right side is cut off.
Figure 6:
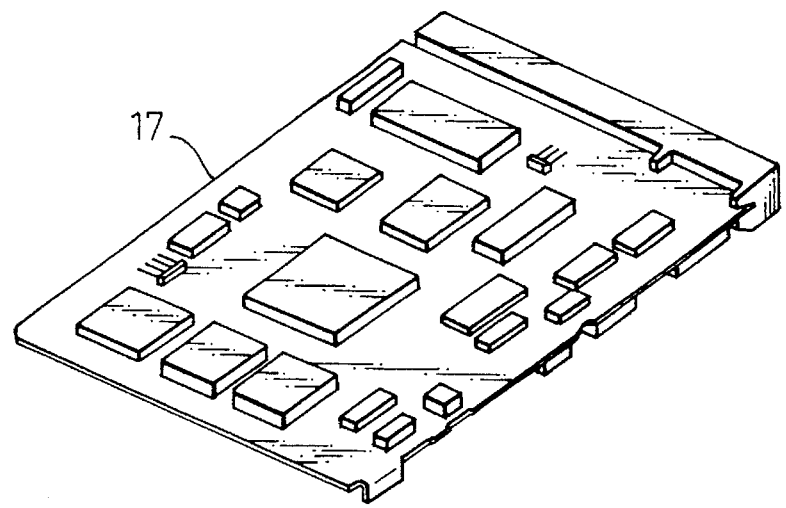
FIG. 6 is a perspective view of a printed circuit board of the embodiment.
Figure 7:
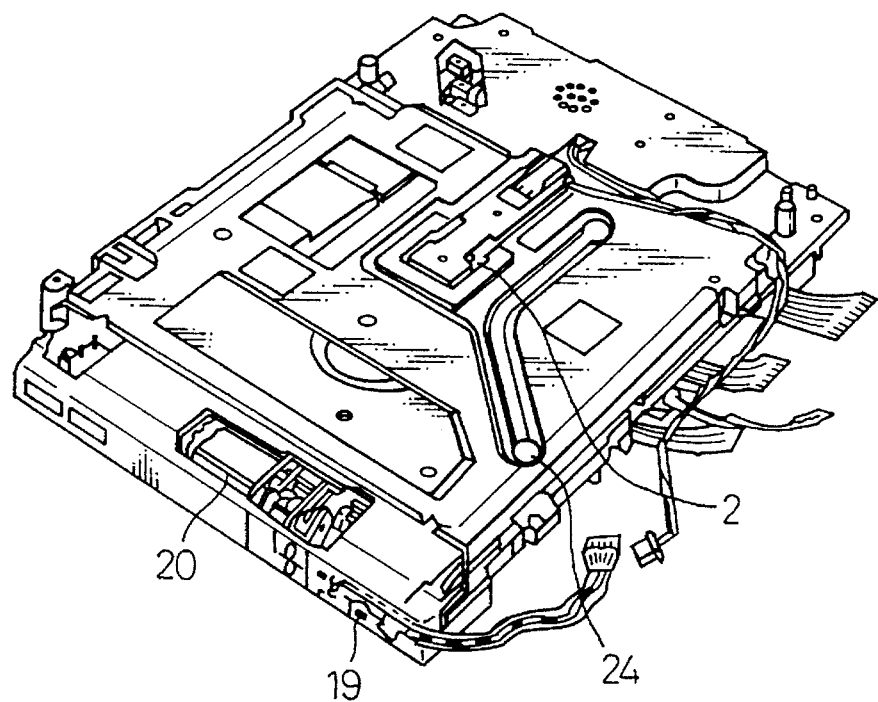
FIG. 7 is a perspective view of inside of the unit shown in FIG. 4.
Figure 8:
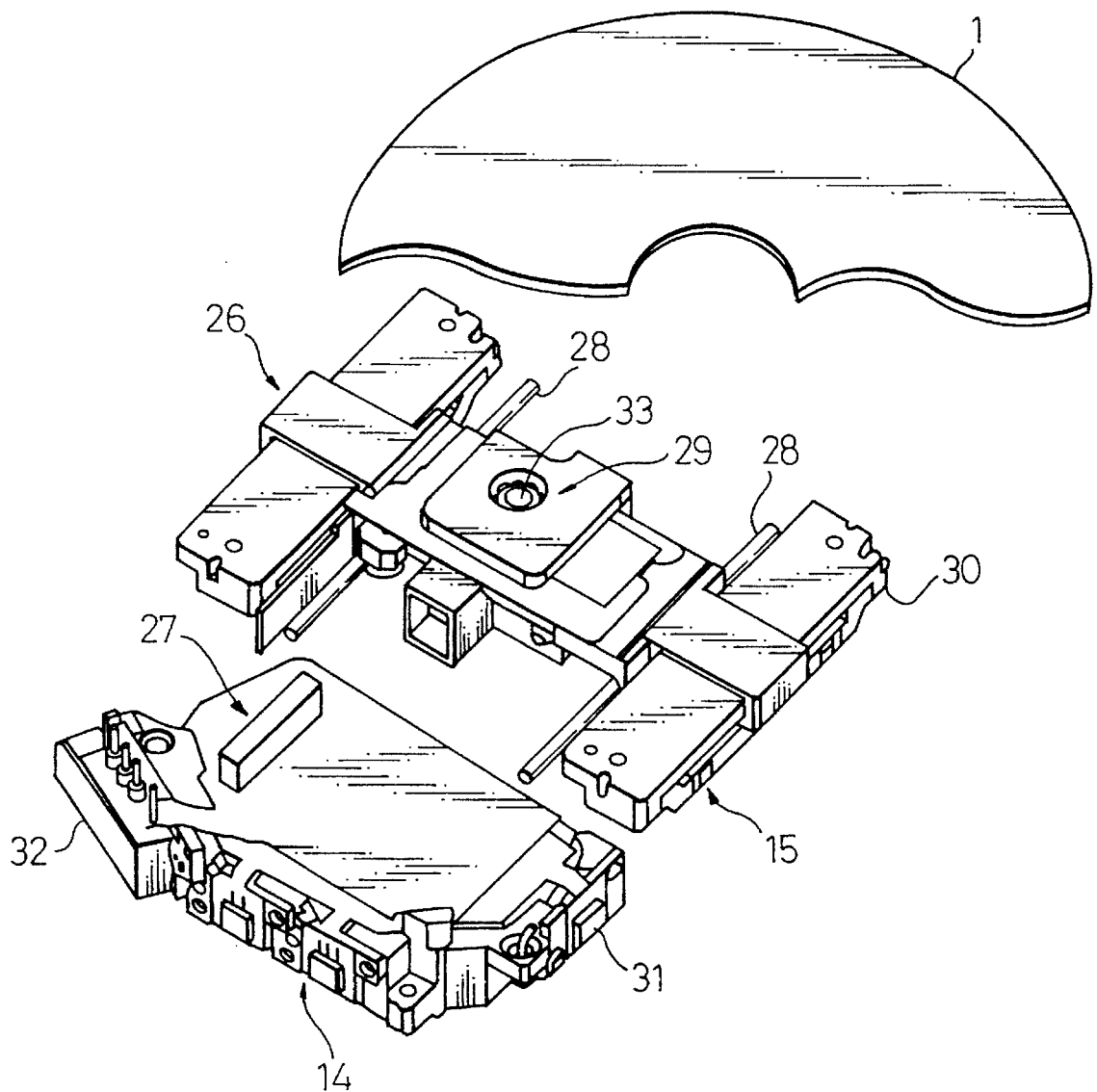
FIG. 8 is a perspective view of an optical unit of the embodiment.
Figure 9:
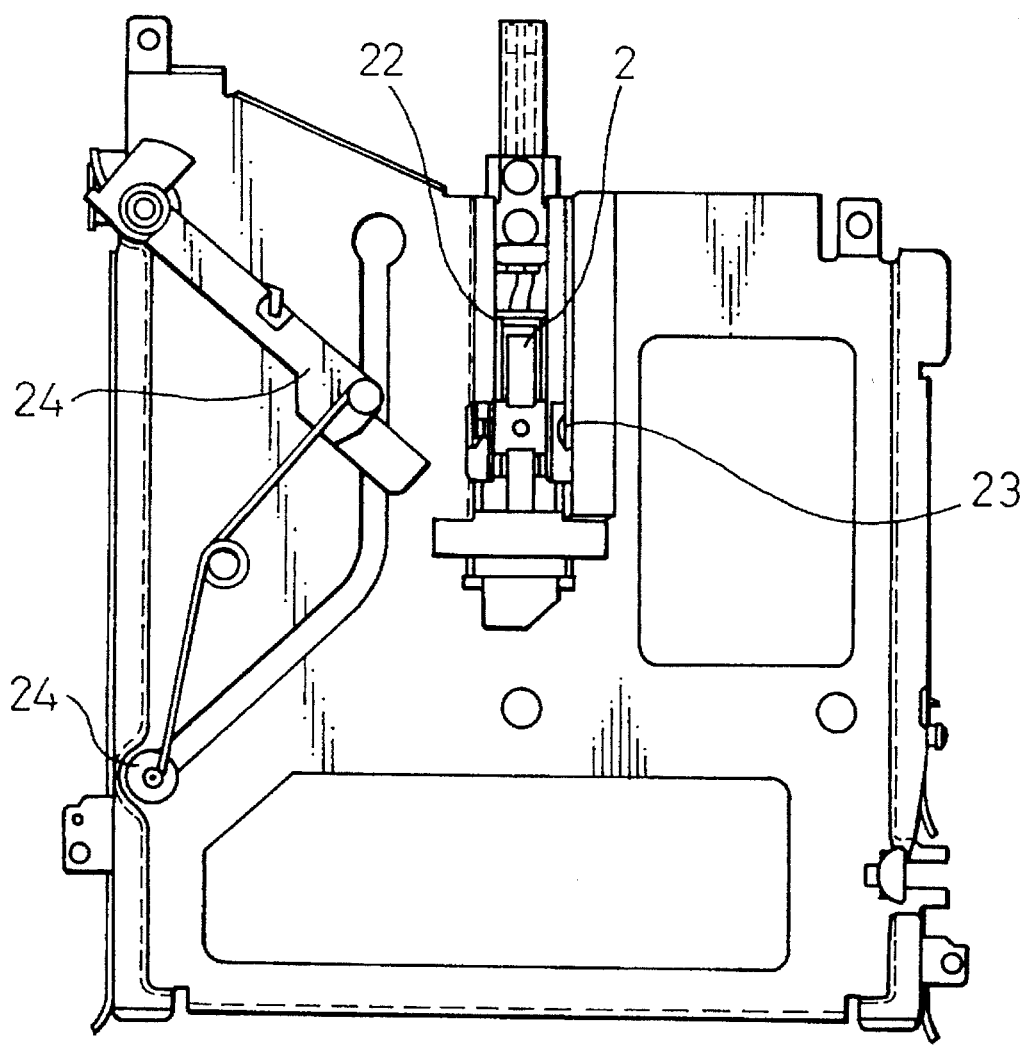
FIG. 9 is a plan view of a bias mechanism.
Figure 10:
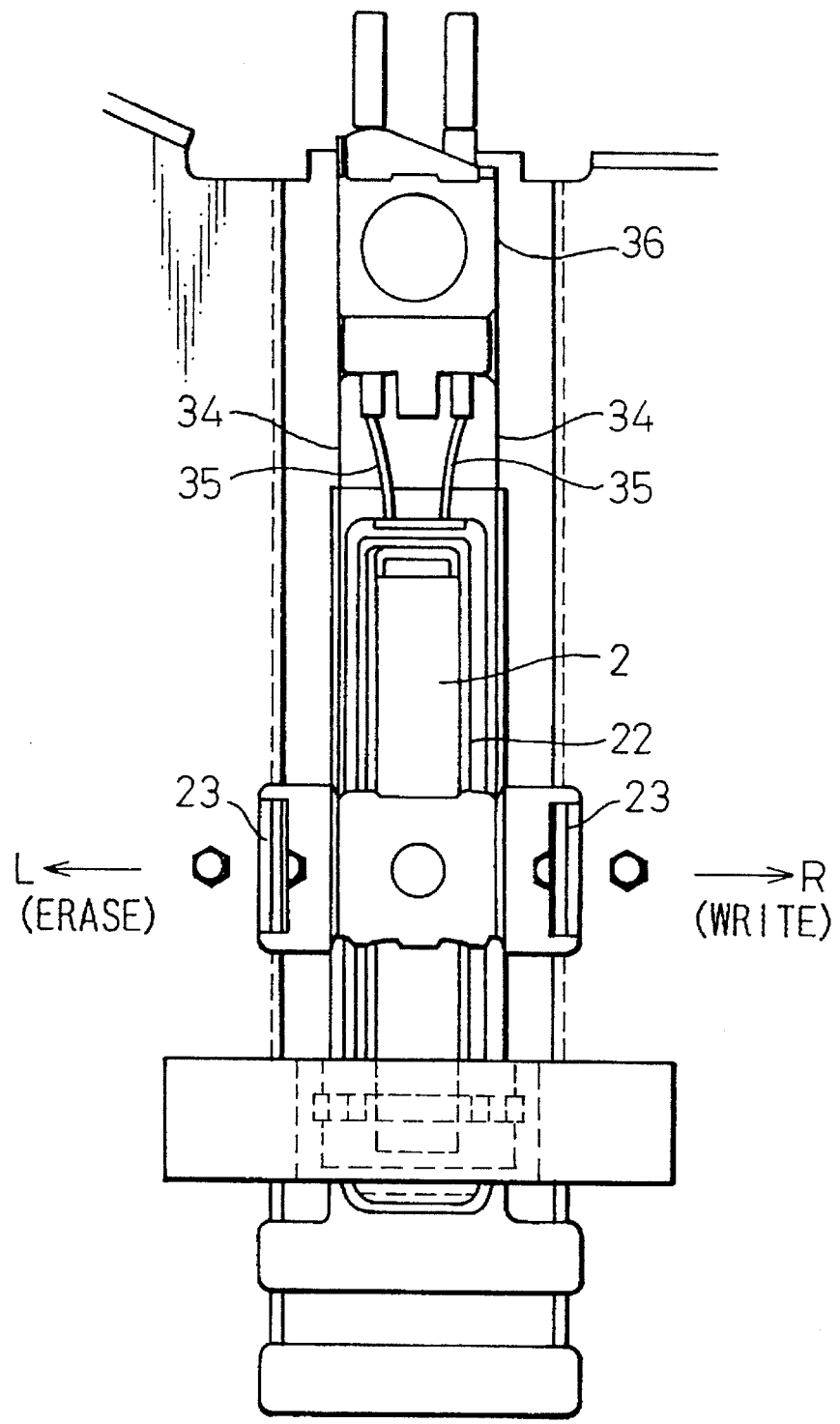
FIG. 10 is a magnified plan view of a portion of the bias mechanism.

FIG. 4 is a perspective view from front upper side; FIG. 5 is a perspective view when the right-hand side is cut off;

FIG. 6 is a perspective view of a printed circuit board; FIG. 7 is a perspective view of the inside of the unit; FIG. 8 is a perspective view of an optical unit; FIG. 9 is a plan view of a bias mechanism; FIG. 10 is a magnified plan view of a portion of the bias mechanism.

In FIGS. 4 to 10, reference numeral 8 indicates a body frame; 9 indicates a front panel; 10 indicates a top cover; 11 indicates a SCSI (Small Computer Systems Interface) connector; 12 indicates an entrance for the medium; 14 indicates a fixed optical unit; 15 indicates a movable optical unit; 16 indicates a spindle motor unit; 17 indicates a printed circuit (PC) board; 19 indicates an eject switch; 22 indicates a bias magnet moving coil; 23 indicates stoppers; 24 indicates a shutter arm for opening and closing a shutter; 26 indicates a positioner; 27 indicates a connector; 28 indicates rails; 29 indicates a lens actuator; 30 indicates a magnetic circuit; 31 indicates a photo cell; 32 indicates a laser diode unit; 33 indicates an objective lens; 34 indicates a blade spring; 35 indicates leads; 36 indicates a support unit; 49 indicates a bias application unit; and 54 and 56 indicates a drive circuit.

As shown in FIG. 4, the top cover 10 is provided on the body frame 8, and the front panel 9 is provided at front side. The entrance of the optical magnetic disk (medium) is provided on the front panel 9, and the medium is inserted or discharged through this entrance 12. At rear side, the SCSI connector 11 is arranged.

As shown in FIG. 5, in the optical magnetic disk unit, the fixed optical unit 14, the movable optical unit 15, the spindle motor unit 16 and so forth are provided. The printed circuit board 17 shown in FIG. 6 is arranged directly under the top cover 10, and a mechanical portion shown in FIG. 7 is provided under the print circuit board 17. The printed circuit board 17 includes electrical elements thereon. A bias mechanism consisting of the bias magnet (permanent magnet) 2, etc., and the shutter arm are provided on the upper side, which faces the print circuit board 17, of the mechanical portion shown in FIG. 7. The eject switch 19 and the eject motor 20 are provided on the mechanical portion. Further, an area under the bias magnet 20 forms a medium insertion portion, and the movable optical unit 15 is arranged under the medium insertion portion.

The eject motor drives a medium eject mechanism which eject the optical magnetic disk (medium), and the eject switch 19 activates the eject motor 20.

As shown in FIG. 8, an optical unit of the head includes the fixed optical unit 15 and the movable optical unit 15. The movable optical unit 15 includes a objective lens 33, the lens actuator 29, etc. The movable optical unit 15 is driven by the positioner 26 to move along the rails 28. The fixed optical unit 14 includes other optical elements excluded those of the movable optical unit 15, for example, the photo cell 31, the laser diode 32, the connector 27, etc.

In this optical unit, laser light output from the laser diode 32 passes through the optical systems in the fixed optical unit 14 and the movable optical unit 15, then, it is projected onto the surface of the optical magnetic disk (medium) 1. The laser light reflected by the medium 1 passes through the above path in reverse direction, then, the laser light is received by the photo cell 31.

FIG. 9 shows the bias mechanism when it is viewed from the inside, namely, from the medium insertion portion. As shown in FIG. 9, the bias mechanism includes the bias magnet 2, the bias magnet moving coil 22, the stopper 23, etc. The bias mechanism is arranged on an opposite side of the medium relative to the above-mentioned optical system. The bias magnet (permanent magnet) 2 is divided into two elements in the longitudinal direction. The two element are magnetized to different polarities. The bias magnet (permanent magnet) 2 is arranged so that the longitudinal direction thereof coincides with the radial direction of the medium.

Further, the shutter arm 24 is arranged in the neighborhood of the bias mechanism. The shutter arm 24 opens or closes the shutter provided on a medium cassette.

A magnified view of the bias mechanism is shown in FIG. 10. The bias mechanism includes the bias magnet (permanent magnet) 2, the bias magnet moving coil 22, the stopper 23, the blade springs 32, the leads 35, the support unit 36, etc.

In this bias mechanism, the bias magnet 2 is supported by the blade springs 34 to be movable in either of a left direction L or a right direction R as shown in FIG. 10. The bias magnet moving coil 22 is arranged close to and under the bias magnet 2 and it moves the bias magnet 2 in L or R directions in response to a command from the MPU. When a current flows through the bias magnet moving coil 22, the bias magnet moving coil 22 generates a magnetic field. The polarity of the magnetic field is determined according to the direction of the current flowing through the bias magnet moving coil 22. When the magnetic field repels the bias magnet 2, the bias magnet 2 moves due to the repulsion force and it is pushed against the stopper 23. Therefore, the movement direction of the bias magnet 2 is determined according to the direction of the current through the bias magnet moving coil 22. When the bias magnet 2 is pushed against the stopper 23, the longitudinal direction of the bias magnet 2 coincides with radial direction of the medium. When data is to be written, for example, the bias magnet 2 moves in the R direction shown in FIG. 10 and when data is to be erased, the bias magnet 2 moves in the L direction shown in FIG. 10.

Figure 11A:
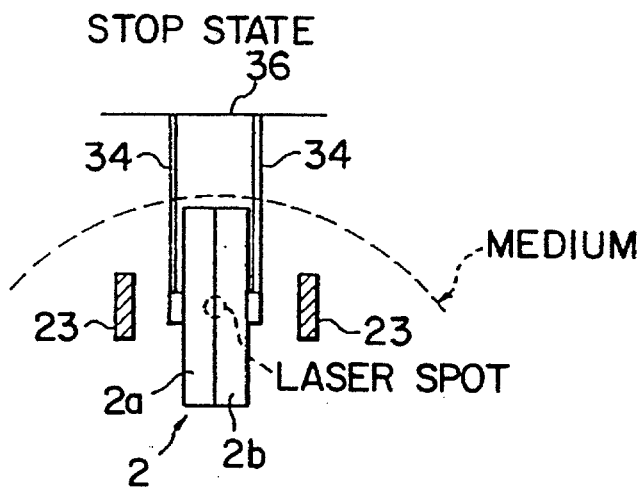
FIGS. 11A to 11C are diagrams showing positions of the bias magnet in respective operation states.
Figure 11B:
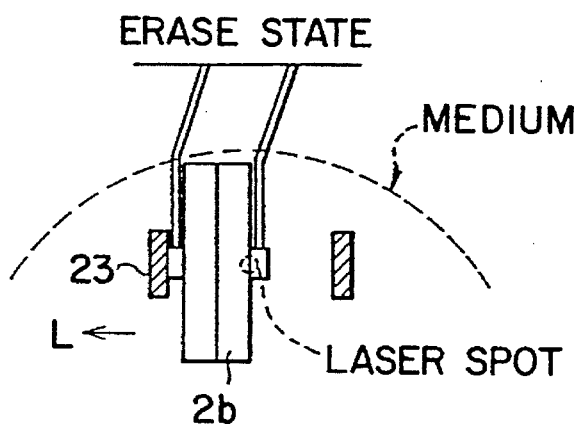
Figure 11C:
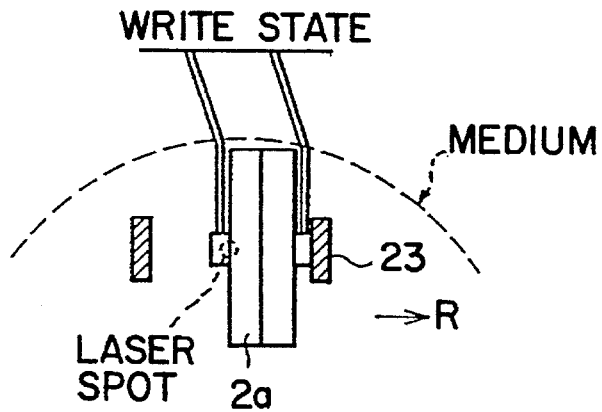

FIGS. 11A to 11C are diagrams showing positions of the bias magnet in respective operating states. The operations of the bias mechanism is explained with reference to FIGS. 11A to 11C.

FIG. 11A show the position of the bias magnet 2 when no current flows through the bias magnet moving coil 22. This state is called the stopped state. FIG. 11B shows the position of the bias magnet 2 for erasing and FIG. 11C shows the position of the bias magnet 2 for writing. As described above, the bias magnet 2 is divided into two elements 2a and 2b which have different polarities.

When no current flows through the bias magnet moving coil 22, as shown in FIG. 11A, the bias magnet 2 is maintained a the central position between the two stoppers 23 by the return force of the flat springs In this state, the laser spot is projected on the position corresponding to the margin between the two magnet elements 2a and 2b.

When data is to be erased, as shown in FIG. 11B, the bias magnet 2 moves in the L direction and is pushed against the left stopper 23. The magnetic field generated by the bias magnet moving coil 22 attracts the element 2b of the bias magnet and repels the element 2a. In this state, the element 2b faces the position of the laser spot projected on the medium, therefore, the element 2b applies a bias magnetic field having the polarity for erasing.

When data is written, as shown in FIG. 11C, the bias magnet 2 moves in R direction and is pushed against the right stopper 23. The magnetic field generated by the bias magnet moving coil 22 attracts the element 2a of the bias magnet and repels the element 2b. In this state, the element 2a faces the position of the laser spot projected on the medium, therefore, the element 2b applies a bias magnetic field having a polarity for writing.

Figure 12:
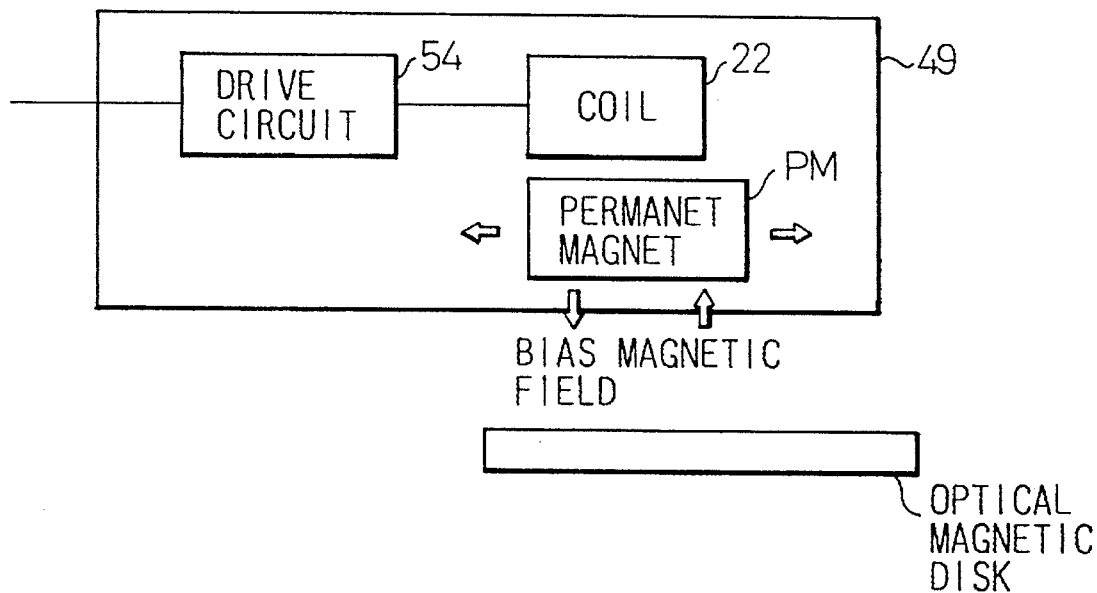
FIG. 12 is a block diagram showing a fundamental constitution of a bias application unit including a permanent magnet.
Figure 13:
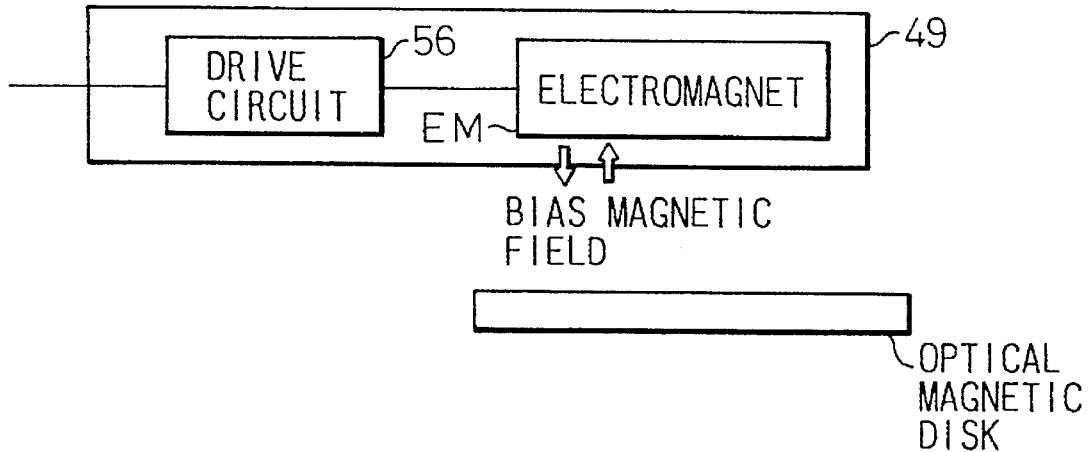
FIG. 13 is a block diagram showing a fundamental constitution of a bias application unit including an electromagnet.

The bias application unit can be also realized using an electromagnet. FIG. 12 is a block diagram showing a fundamental constitution of the bias application unit including a permanent magnet, and FIG. 13 is a block diagram showing a fundamental constitution of the bias application unit including an electromagnet. The difference between when the permanent magnet is used and when the electromagnet is used is explained with reference to FIGS. 12 and 13.

As described above, in the constitution shown in FIG. 12, the bias application unit 49 includes a bias magnet moving coil 22; a drive circuit 54; and a permanent magnet PM corresponding to the bias magnet 2 shown in FIGS. 9 and 10. The permanent magnet PM moves to a write side or an erase side under the control of the bias magnet moving coil 22. The drive circuit 54 controls the current.

The bias application unit 49 shown in FIG. 13 includes an electromagnet EM and a drive circuit 56. The drive circuit 56 controls a current flowing through the electromagnet EM. The bias magnetic field generated by the electromagnet EM changes its polarity according to a direction of the current flowing through the electromagnet EM.

FIG. 12 is a block diagram showing the constitution of the optical magnetic disk unit of the embodiment. In FIG. 12, same reference numerals as in FIGS. 4 to 13 are used.

Figure 14:
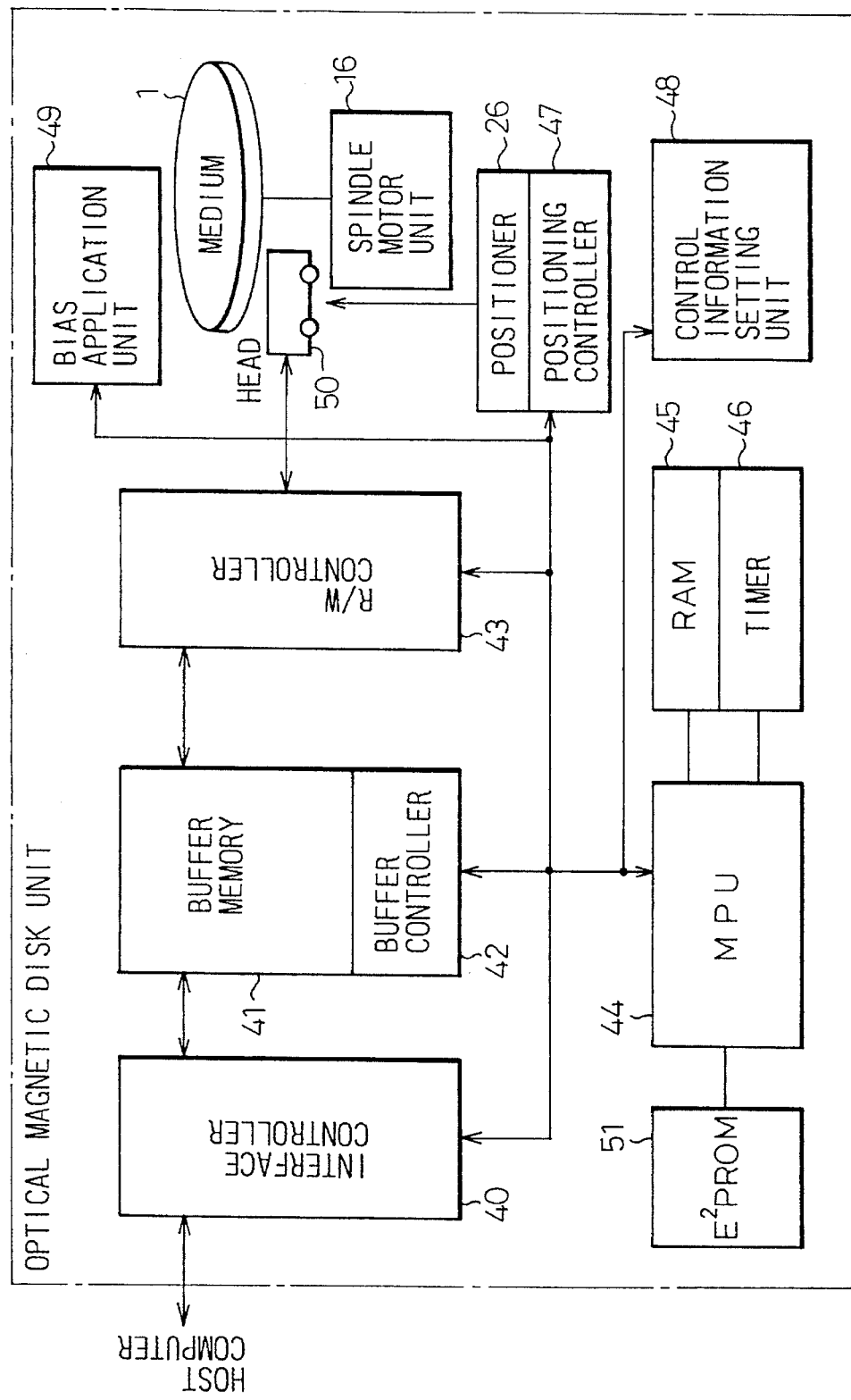
FIG. 14 is a block diagram showing a constitution of the optical magnetic disk unit of the embodiment.

In FIG. 14, reference numeral 40 indicates an interface controller; 41 indicates a buffer memory; indicates a buffer contoller; 43 indicates a read/write controller; 44 indicates a microprocessor (MPU); indicates a RAM (Random Access Memory); 46 indicates a timer; 47 indicates a positioning controller; 48 indicates a control information setting unit; 49 indicates a bias application unit; 50 indicates a head; and 51 indicates $E^2PROM$ (Electrically Erasable Programmable Read Only Memory). The optical magnetic disk unit further includes the spindle motor unit 16; the positioner 26; and the bias application unit 49.

The spindle motor unit 16 rotates the optical magnetic disk (medium) 1. The interface controller 40 controls interface operations with the host computer. The buffer memory 41 temporarily stores data transferred with the host computer, for example, a plurality of data blocks which are to be written into the optical magnetic disk unit. The buffer controller 42 controls reading and writing of data into or from the buffer memory 41 according to instructions from the MPU 44. The read/write controller 43 performs various operations to write data onto the medium (formatting operation, etc.,) and performs various operations to read data from the medium.

The MPU 44 performs various control operations for the optical magnetic disk unit. The RAM 45 is used as work memory for the MPU 44. For example, when the MPU 44 stops the current to the bias magnet which generates the magnetic field for erasing, the MPU temporarily stores control information such as a polarity, etc., about the bias magnet. Further, when the MPU 44 receives read command, the MPU 44 calculates the time Td from the start of the read operation to the restart of the bias control. The data relating to the time Td is also stored in the RAM 45.

The timer 25 measures time according to instructions from the MPU 44. In practice, the timer 46 starts measuring time when the MPU 44 outputs a start command to the timer 46, and the timer 46 stops measuring of time when the MPU 44 outputs a reset command to the timer 46. The MPU 44 can monitor the passage of time by reading a value in the timer 46.

The positioning controller 47 controls the positioner 26 according to instructions from the MPU 44 so that the head 50 is to be positioned at a target position (target block) on the medium.

The control information setting unit 48 may be composed of various kinds of setting switches such as a dip-switch. In the control information setting unit 48, for example, a monitor duration t1, modes peculiarly determined according to each unit, and codes for the interface (SCSI) are set.

The bias application unit 49 has a constitution shown in FIGS. 9 and 10. When an electromagnet is used, the bias application unit 49 includes a current controller, etc., in addition to the electromagnet. The bias application unit 49 switches the bias magnet between the erase state, write state, and the stop state according to a control signal from the MPU 44.

The head 50 projects laser light onto the medium and receives the laser light reflected from the medium. In this embodiment, the head 50 corresponds to a combination of the fixed optical unit 14 and the movable optical unit 15 shown in FIG. 9.

The $E^2PROM$ 51 is an electrically erasable nonvolatile memory to which the MPU 44 has access. Various information is previously stored in the $E^2PROM$ 51, and the MPU 44 read the information from the device as the occasion demands. Further, information instructed by the host computer is stored in this memory. Data stored in the $E^2PROM$ 51 includes the monitor time t1, the bias movement time Tb, the transfer time Xr (byte/second) for read data, a design value of time Tt (seconds) necessary for the informing operation of completion of a data reading operation, data regarding a sector length such as Se=512 bytes, and so forth. The $E^2PROM$ 51 also stores various data input by the control information setting unit Next, the operations of the optical magnetic disk unit are explained.

The operations which occur when the host computer outputs a write command and the optical magnetic disk unit receives this command are as follows. The interface controller 40 receives the write command and sends it to the MPU 44. The MPU 44 analyzes the contents of this command. The MPU 44 performs various control operations according to the results of the analysis. When the command is a write command, the host computer sends a plurality of data blocks. The MPU 44 outputs a control instruction to the buffer controller 42. In response to this instruction, the buffer controller 42 controls the buffer memory 41 to store these data blocks. In response to a control signal from the positioning controller 47, the positioner 26 drives the head 50 (the movable optical unit) to a target position (target block). Then, the data blocks in the buffer memory 41 are sent to the read/write controller 43. Processes necessary for writing are performed to the data blocks in the read/write controller 43, and the data blocks are written onto the medium via the head 50. Namely, when the optical magnetic disk unit receives the write command, a transfer operation of a data block and a positioning operation of the head are simultaneously performed. After the positioning operation is completed, the write operation to the medium is performed.

As described above, when the data blocks are written, an erase operation is performed on the area on the medium to which the data blocks are written by an instruction from the host computer, then, the data are written onto the area. The written data is read to verify that the data was written correctly.

While the above-mentioned operations are happening, the MPU 44 outputs a control signal to the bias application unit 49. In response to this control signal, the bias application unit 49 applies the bias magnetic field suitable for the operations by switching the bias magnet 2. When the MPU 44 controls the position of the bias magnet 2, the MPU 44 accesses to the $E^2PROM$ 51 and the RAM 45 and reads or writes data. The MPU 44 further accesses the timer 46 to read the timer information.

In the following, examples of the data-write operation to the medium are explained.

Figure 15:
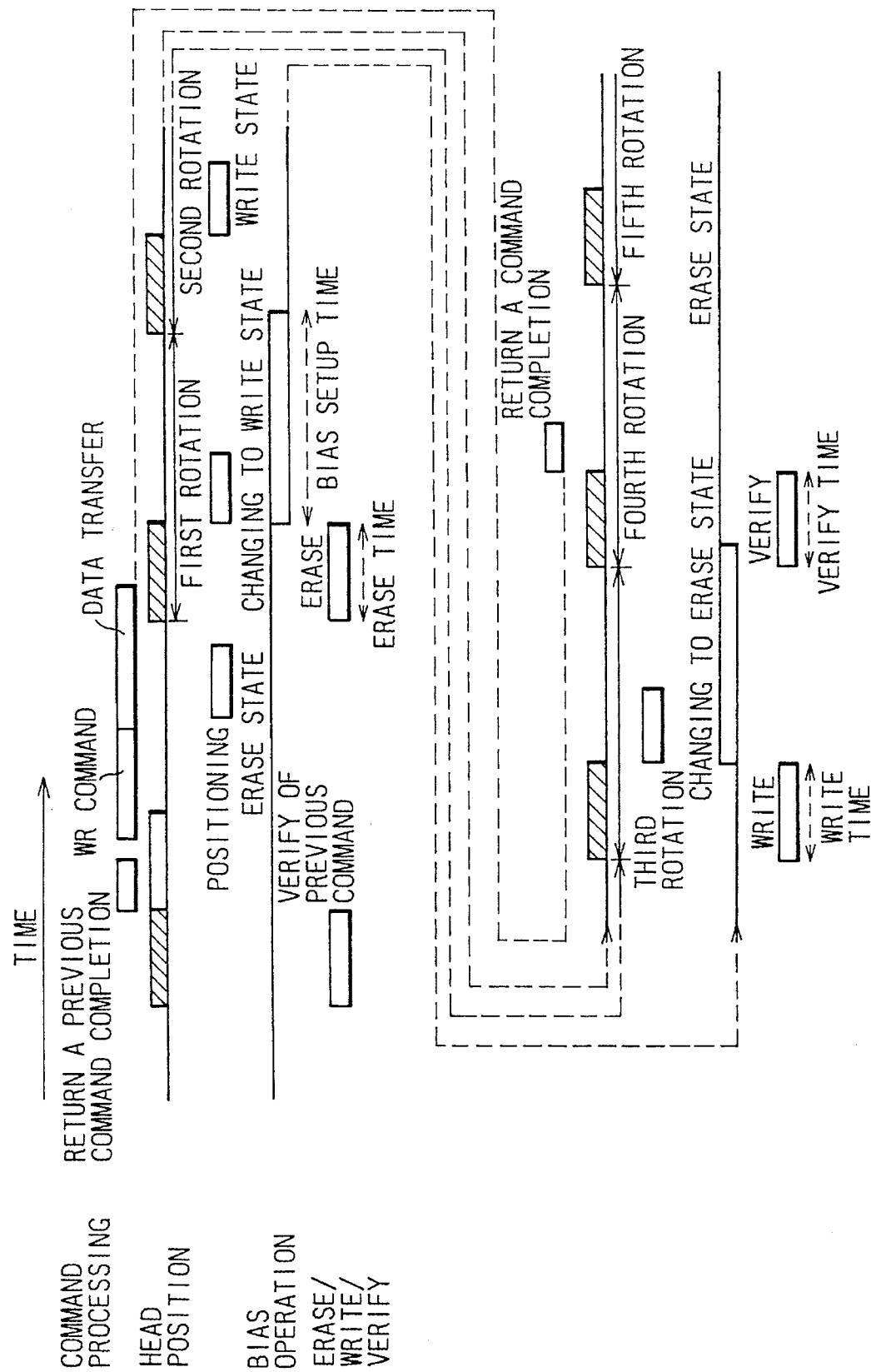

FIG. 15 is a time-chart showing a sequence of a first example.

In FIG. 15, changes with time of command processes, head position, bias operations, and the types of operations (erase/write/verify) of the first example are shown.

In the first example, data is written onto the medium using, in order, an erase operation, a write operation and a verify operation. Namely, before data is written on the medium, an erase operation is performed on the area on the medium to which the data blocks are to be written, then, the data are written onto the area. The written data is read to verify that the data is written correctly. Further, after the write operation is completed, the bias magnet 2 promptly moves to the erase state and remains in this state.

As shown in FIG. 15, after the write command is received, the bias magnet promptly moves to the erase state and the head also starts to move to the target position. When the command data transfer operation is completed, the bias magnet is already set to the erase state and the head is positioned at the target position, therefore, the erase operation can starts promptly because this operation requires no write data but only position data. After the erase operation during the first rotation, the bias magnet promptly moves to the write state. However, because the bias-set-up time is long, the bias magnet does not move to the write state until the area passes under the head again. Therefore, the write operation starts at the third rotation. Further, after the write operation is completed, the bias magnet 2 promptly moves to the erase state and maintains its state.

When write commands to write data on a plurality of continuous areas on the medium are sequentially output from the host computer, the optical magnetic disk unit simultaneously performs the write data transfer operation and the head positioning operation. When the first write command is received, the state of the bias magnetic field is uncertain, therefore, operations similar to those of the conventional unit are performed until the write operation of the first data is completed. However, an operation to move the bias magnet 2 to the erase state is started after the write operation is completed, therefore, before the verify operation is complete, the bias magnet 2 has already moved to the erase state. Therefore, when a second write command, to write data on a second area next to the first area, is received, the erase operation can start promptly after the head positioning is completed. In this way, the wait time due to the bias magnet-set-up time for the erase operation is not required, therefore, the write operation speed can be increased.

In the first example, the erase state is maintained until the bias magnetic field is changed to the write state. However, when the bias magnet is a permanent magnet, current must flow through the bias magnet moving coil in order to maintain the erase state. When an electromagnet is used, the same problem occurs because current must flow through the electromagnet in order to maintain the erase state. In either case, electrical power is consumed in order to maintain the erase state. When no operation is performed or read operations which do not need the erase operation are performed, the power consumed to maintain the erase state is wasted. In the following examples, this problem is solved.

Figure 16:
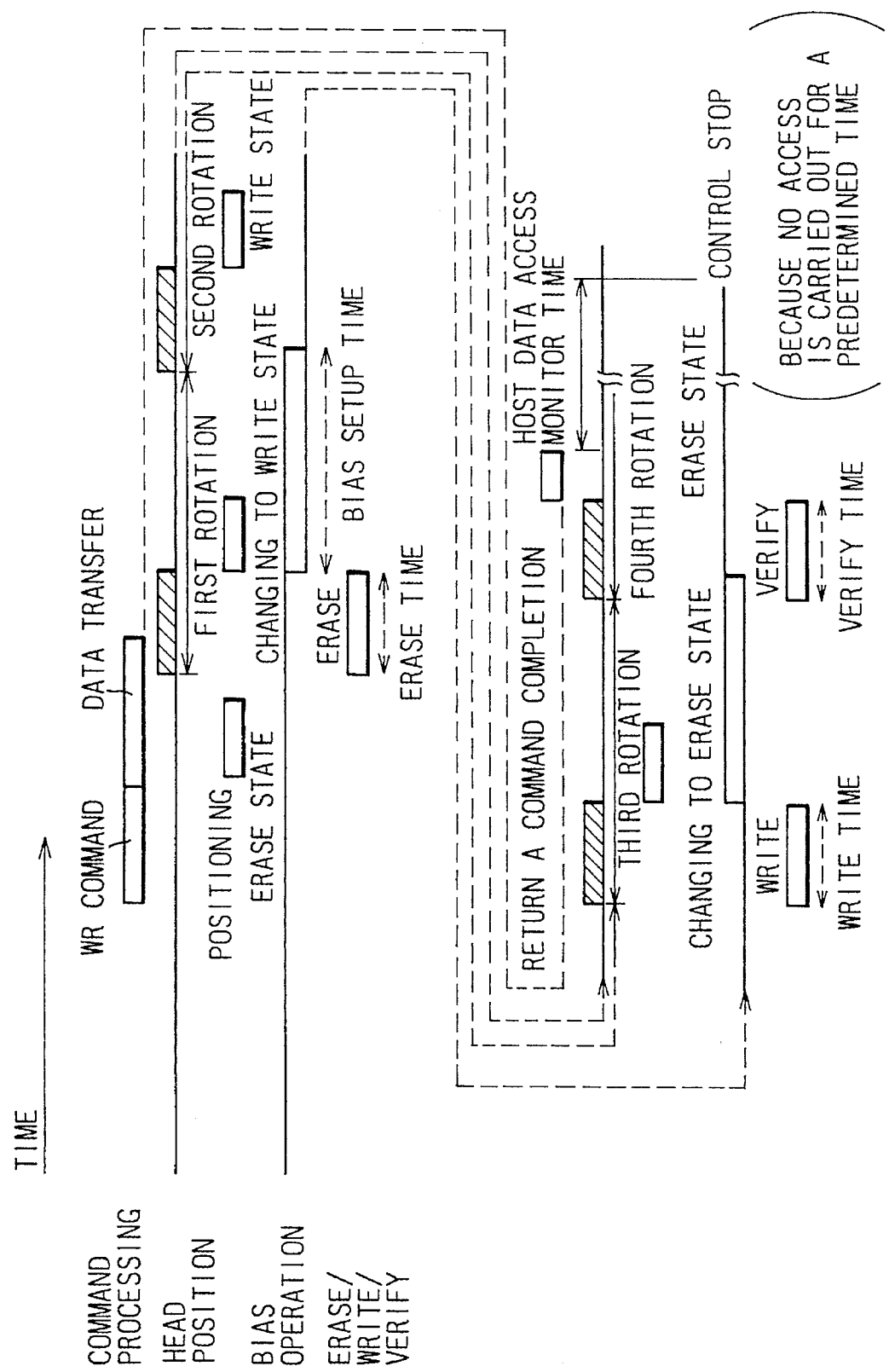

FIG. 16 is a time-chart showing a sequence of a second example.

In FIG. 16, changes with time of command processes, head position, bias operations, and the types of operations (erase/write/verify) of the second example are shown.

In the second example, in the same way as in the first example, data is written onto the medium using, in order an erase operation, a write operation and a verify operation, and after the write operation is completed, the bias magnet 2 promptly moves to the erase state and remains it this state. However, when the erase state is maintained for a predetermined time (a monitoring time t1) without receiving new command, the bias control is stopped.

The MPU 44 measures the time since the last access by the host computer and always monitors whether or not the time exceeds the monitor time t1. When the time exceeds the monitor time t1, the MPU 44 sends a control signal to stop the bias application by the bias application unit 49. In response to this signal, the bias application unit 49 stops the bias application.

In practice, data indicating the monitor time t1 may be previously stored in the $E^2PROM$ 51 as a default value, or may be input by setting a dip switch, or other switches, in the information setting unit 48 and storing the data in the $E^2PROM$ 51 in an initialization operation, or may be indicated in a mode select command, etc., from the host computer and stored in the $E^2PROM$ 51.

After the write operation, the MPU 44 informs the completion of operations corresponding to the write command, then, the MPU 44 starts the timer 46 and monitors the duration by reading a count value of the timer 46. In this monitoring operation, the MPU 44 compares the time determined from the timer 46 with a value read from the $E^2PROM$ 51.

After the MPU 44 confirms that the host computer has made no access after being informed of the completion of the write operation and that the time counted by the timer 46 exceeds the predetermined time t1, it sends a control signal to the bias application unit 49 to stop the bias application. When a new command is received from the host computer, the MPU 44 resets the timer 46 and performs operations indicated by the new command.

Figure 17:
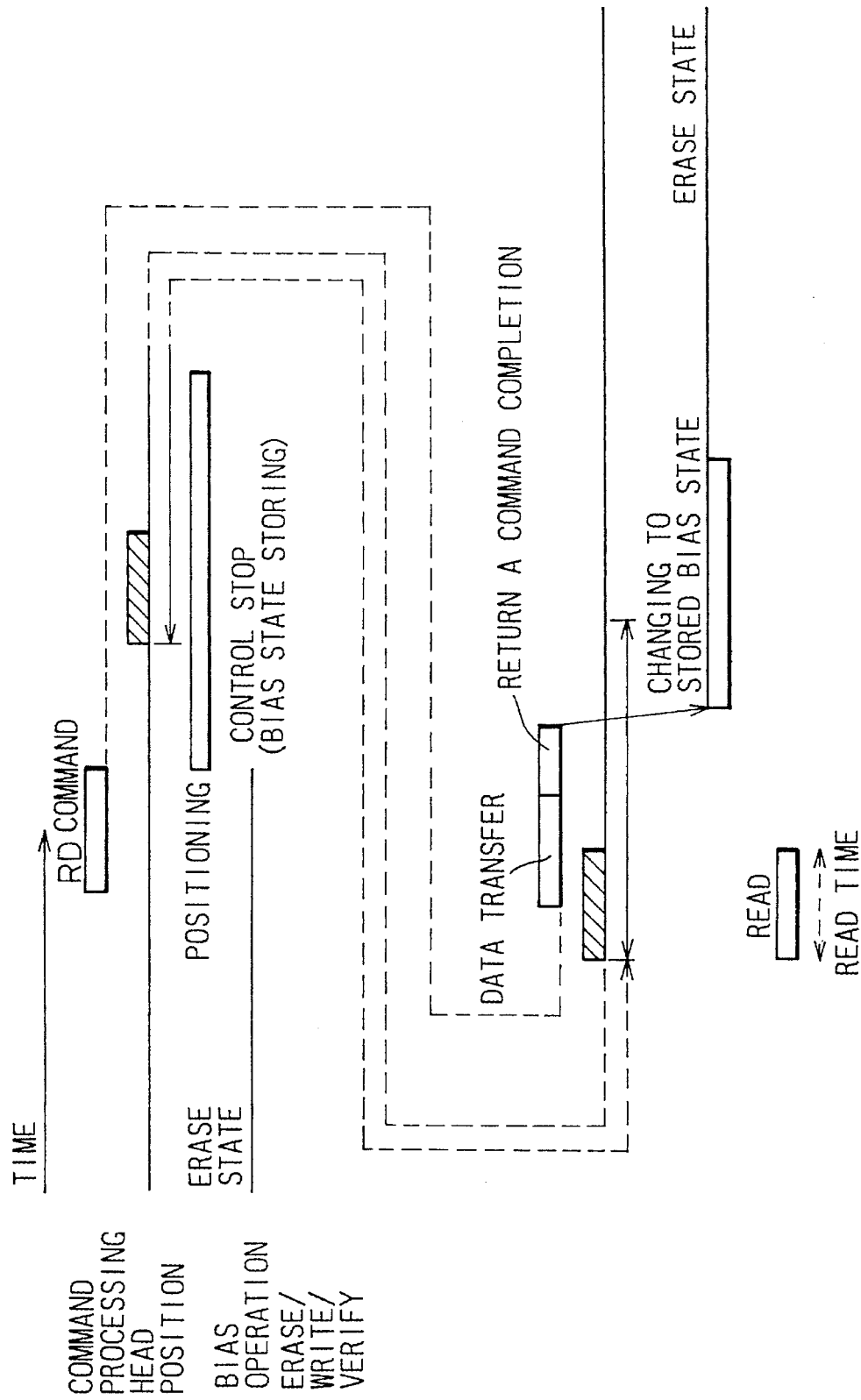

FIG. 17 is a time-chart showing a sequence of a third example.

In FIG. 17, changes with time of command processes, head position, bias operations, and the types of contents of operations (erase/write/verify) are shown.

In the third example, in the same way as the first example, data is written onto the medium using in order, an erase operation, a write operation and a verify operation. After the write operation is completed, the bias magnet 2 moves to the erase state and remains in this state. However, when read command is received while the erase state is maintained, the bias control is stopped.

When the bias control is stopped after the read command is received, the MPU 44 stores control information for the bias magnet 2, such as polarity of the bias magnet and so forth, in the RAM 45. The operations regarding the read command are performed, and the MPU 44 is informed of the completion of the read command. The MPU 44 reads the control information for the bias magnet 2 from the RAM 45 and sends it to the bias application unit 49. In response to this, the bias application unit 49 returns the bias magnetic field to the state it was before the read command was received. Namely, the bias magnetic field returns to the erase state. This operation to return the bias magnet to a former state is called a bias control restart operation.

In the bias control restart operation, the MPU 44 promptly starts the operation to return the bias control to the former state after being informed of the completion of the read command. In this case, the bias magnetic field returns to the erase state when the bias set up time exceeds from the start of the movement of the bias magnet 2, and its state is maintained thereafter.

Explanations regarding another operations are omitted because they are same as those of the first and second examples.

Figure 18:
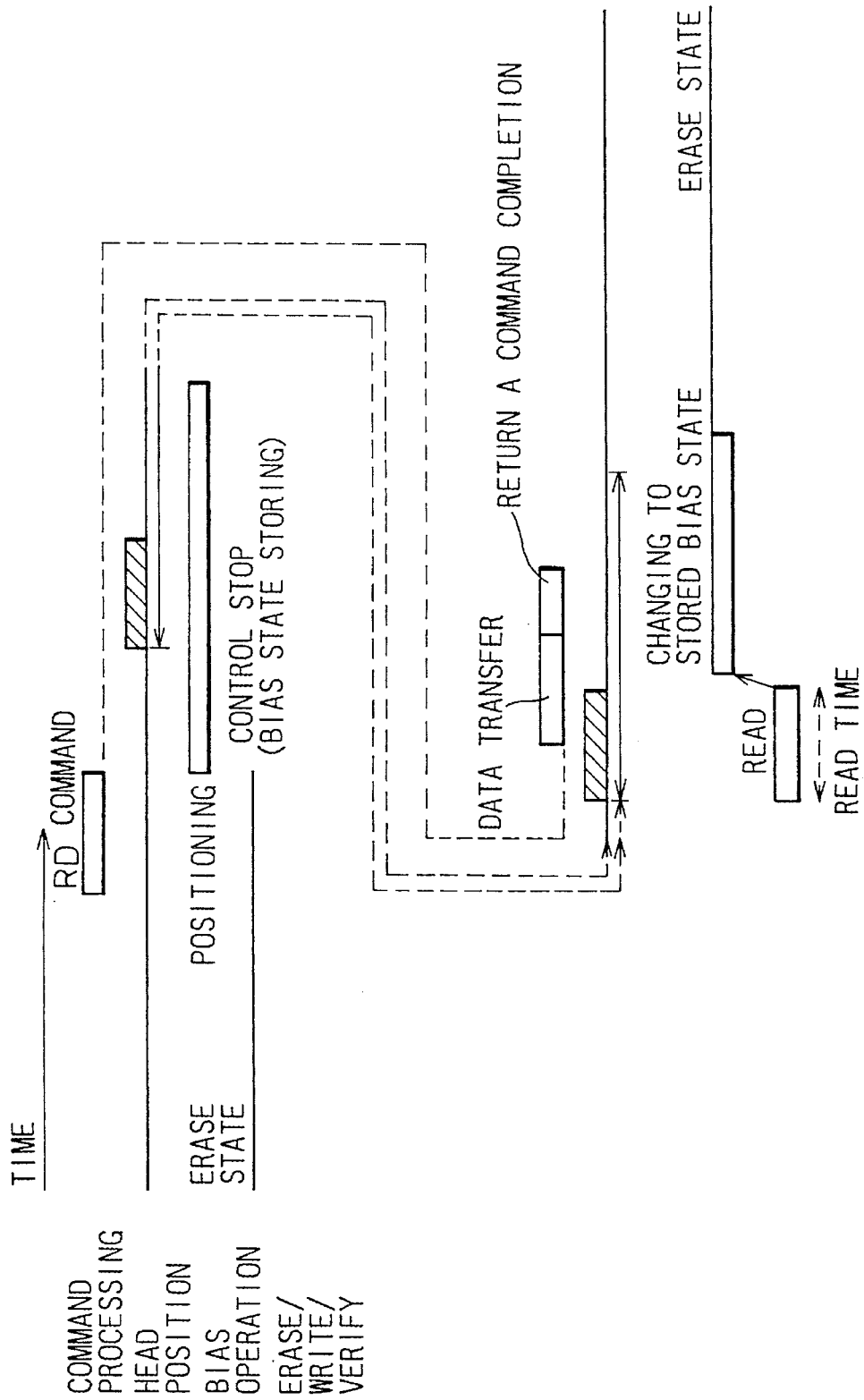

FIG. 18 is a time-chart showing a sequence of a fourth example.

In the fourth example, in the same way as the third example, data is written onto the medium using, in order, an erase operation, a write operation and a verify operation, and after the write operation is completed, the bias magnet 2 promptly moves to the erase state and is maintained in this state. If read command is received while the erase state is maintained, the bias control is stopped. Further, when the read command is completed, the bias magnet is promptly returned to the former state before the completion of the read command.

When the bias control is stopped after the read command is received, the MPU 44 stores control information for the bias magnet 2, such as the polarity of the bias magnet and so forth, in the RAM 45. The operations regarding the read command are performed after receiving the read command. When the read command is completed, the MPU 44 promptly reads the control information for the bias magnet 2 from the RAM 45 and restarts the bias control. The MPU 44 is informed of the completion of the read command.

In this bias control restart operation, the MPU 44 promptly starts the operation to return the bias control to the former state before being informed of the completion of the read command. Therefore, in comparison with the second example, the bias magnetic field returns to the former state faster.

Explanations regarding other operations are omitted because they are the same as those of the first, second and third examples.

Figure 19:
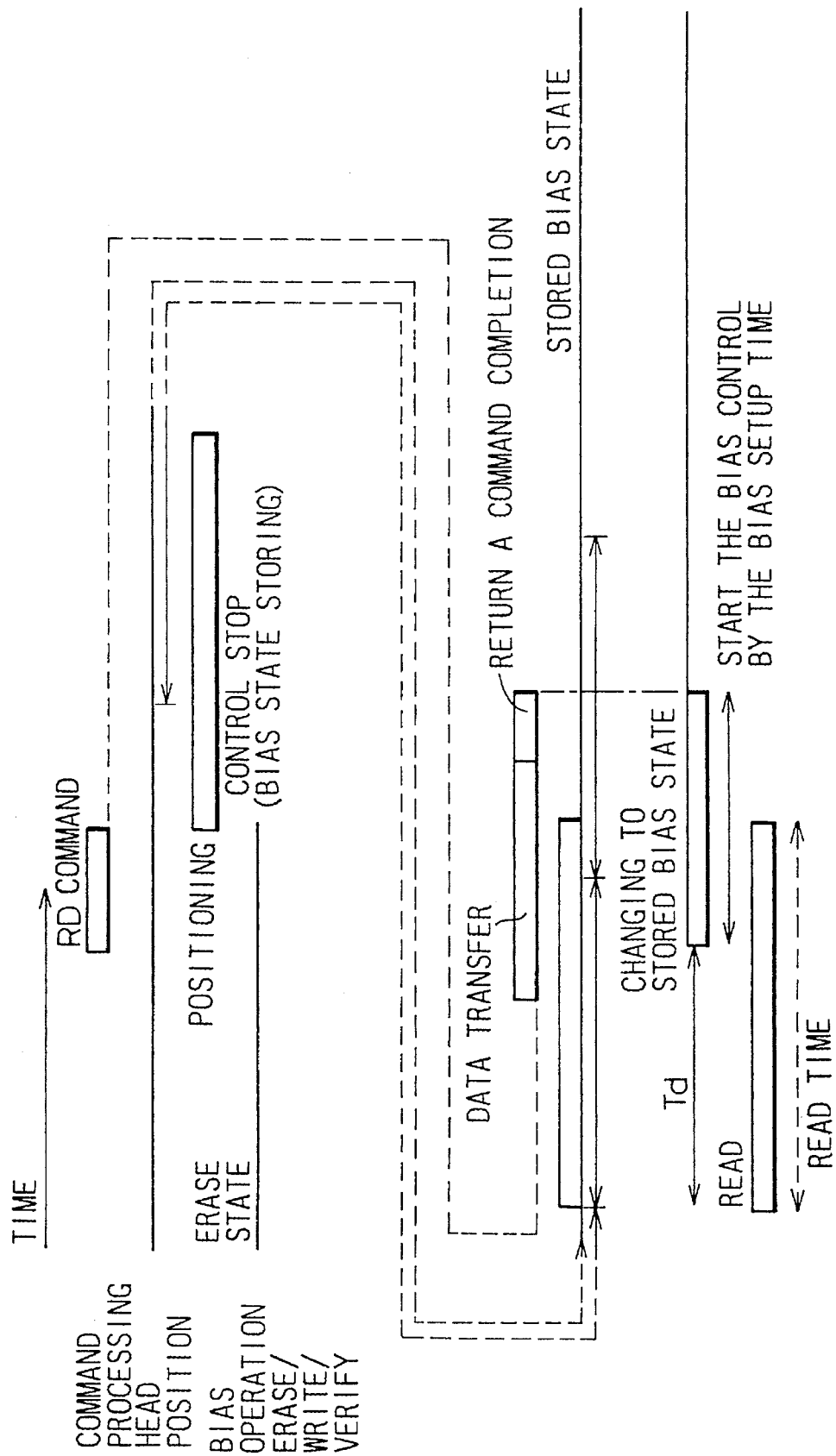

FIG. 19 is a time-chart showing a sequence for a fifth example.

In FIG. 19, changes with time of command processes, the head position, the bias operation, and the operations (erase/write/verify) are also sequentially shown.

In the fifth example, in the same way as in the fourth example, data is written onto the medium using, in order, an erase operation, a write operation and a verify operation, and after the write operation is completed, the bias magnet 2 promptly moves to the erase state and is maintained in this state. When a read command is received while the erase state is being maintained, the bias control is stopped. Further, the completion of the read command and the completion of the bias set up are predicted, and the bias restart operation is started so that two times coincide.

Operations from when the read command is received to when the bias control is stopped are the same as in the preceding examples, therefore, explanations regarding these operations are omitted.

In this example, when the bias control restarts from the stopped state, a time Td, which is the time from the start of the read operation and the restart of the bias control, is calculated. The passage of the time Td is detected by comparing it with a count value in the timer 46.

In practice, the E²PROM 51 stores data regarding the bias movement time Tb, the time Tt which is the predicted time necessary for the informing operation of the completion of the data read operation, a sector length Se such as Be=512 bytes, etc. When the above operations occur, the MPU 44 reads the data and performs the operations according to the data.

When the read command is received, the MPU 44 reads a block of data bk indicated by the parameters in the read command. The MPU 44 reads the data (Tb, Xr, Tt, Se) from the E²PROM 51 and calculates the time Td. The time Td is calculated according to a formula: Td=bk×Se/Xr+Tt−Tb. If the time Td is smaller than or equal to zero, the time Td is set to zero.

The read block data bk indicated by the read command is different for every command, therefore, the time Td must be calculated every time the MPU 44 receives a read command.

In this way, the MPU 44 calculates the time Td and stores it in the RAM 45. When the MPU 44 receives the read operation command, the MPU 44 starts the read operation. At this time, the MPU sets the timer 46 to start counting. During the read operation, the MPU 44 monitors whether or not the count value in the timer 46 exceeds the count for the time Td.

When the elapse of the time Td is detected, the MPU 44 reads the bias control information stored in the RAM 45 and returns the bias control to the former state, namely, the erase state. In this way, the bias control restarts.

When the read operation is completed, the bias magnetic field is set up because the time Td has passed.

FIG. 20 is a time-chart showing a sequence of a sixth example.

In FIG. 20, changes with time of command processess, head position, bias operations, and the types of the operations (erase/write/verify) are shown.

In the sixth example, in the same way as in the second example, data is written onto the medium using, an erase operation, a write operation and a verify operation and, after the write operation is completed, the bias magnet 2 promptly moves to the erase state and remains in this state. When read command is received while the erase state is being maintained, the bias control is stopped. Further, the bias control operation restarts when any command is received.

Next, the above examples of operations when data is written on the medium are explained with reference to flow-charts.

FIGS. 21A and 21B show a flowchart of a sequence of operations common to the above examples.

Figure 22:
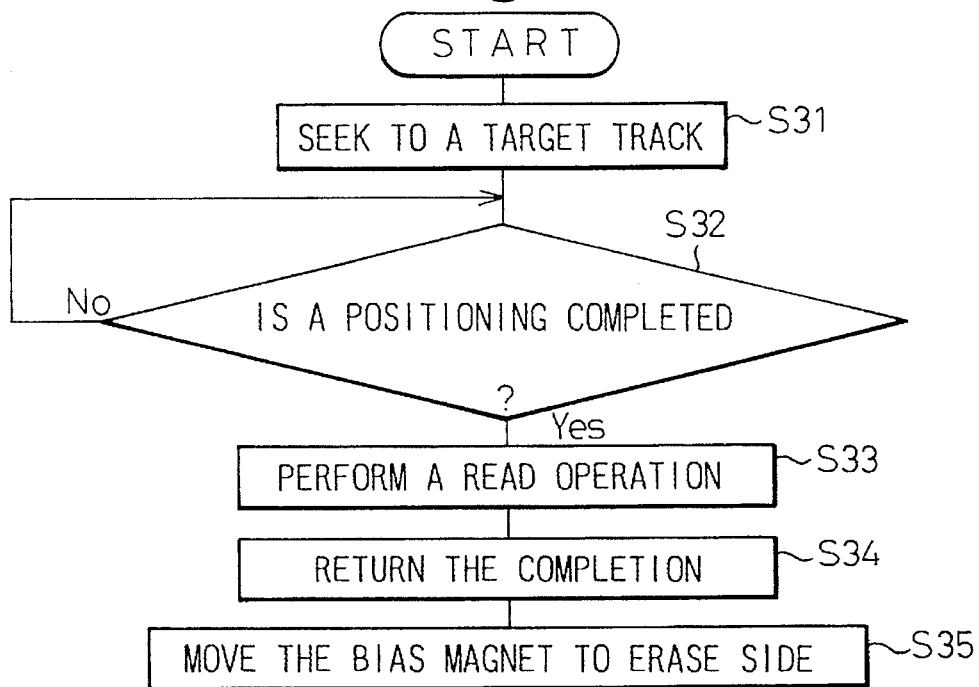
FIGS. 22 to 25 are flow-charts showing operations of the examples of bias control methods.
Figure 23:
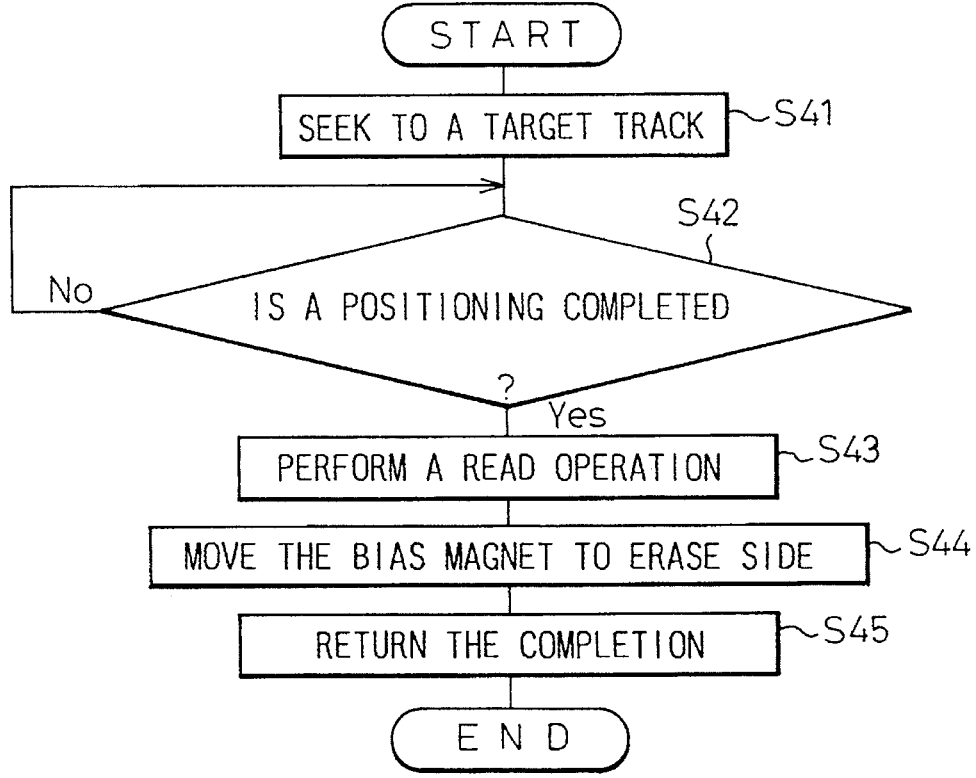
Figure 24:
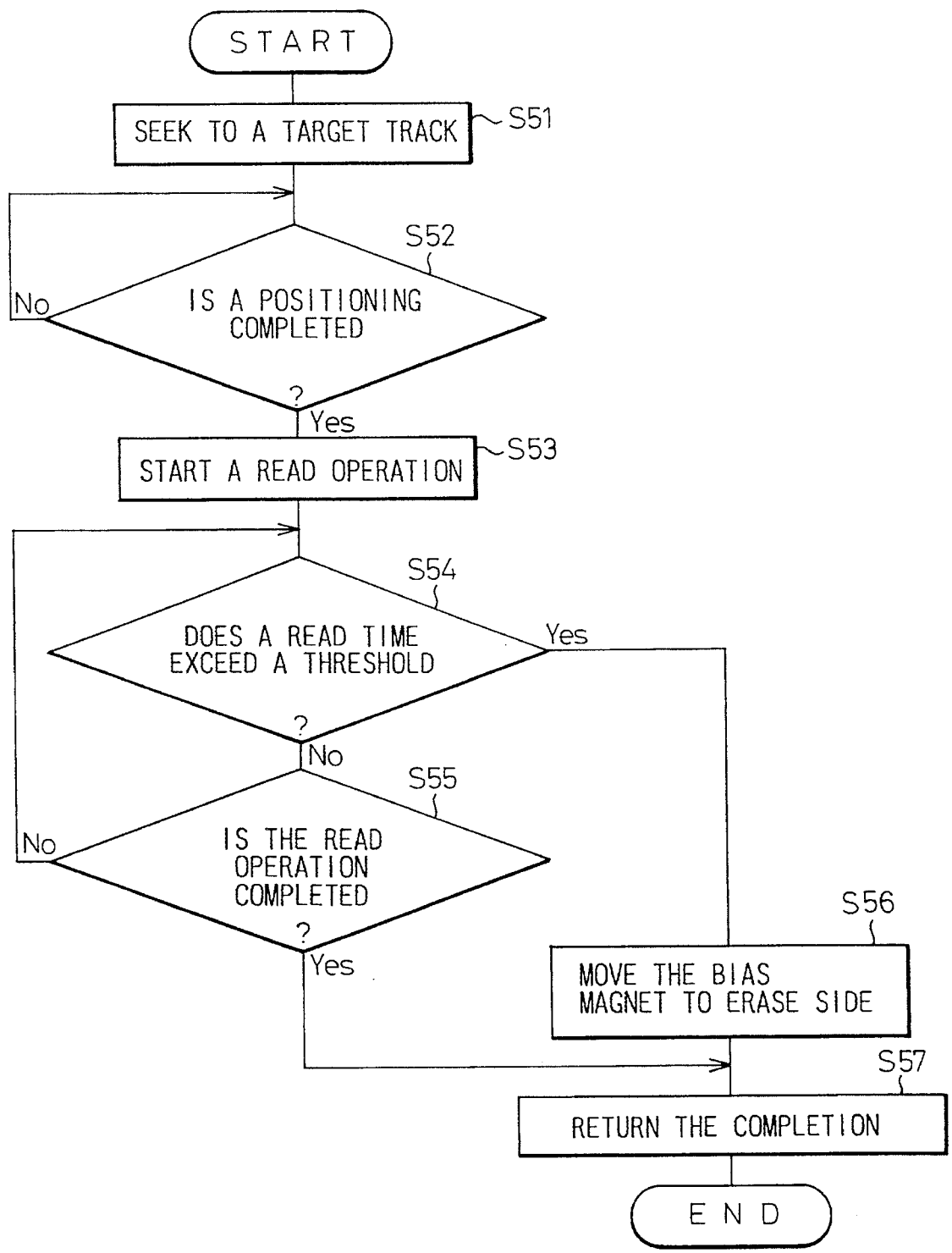

In the flowchart shown in FIGS. 21A and 21B, the steps S1, S2, S6, S11 to S16 correspond to the operations of the first example shown in FIG. 15. The steps S3 to S5 relate to the second example shown in FIG. 16. The steps S8 to S10 relate to the third to sixth examples shown in FIGS. 17 to 20. FIGS. 22 to 24 show details of operation R which includes steps S8 and S9.

At step S1, the MPU 44 informs the host computer of the completion of execution of the previously received command.

At step S2, the MPU 44 detects whether or not a command has been received. When a command is received, the control proceeds to step S6. In the first example, the control waits at this step S2 until the command is received.

At step S6, the MPU 44 judges whether or not the received command is a read command. When it is not a read command, the control proceeds to step S11. In the first example, when the received command is a read command, the read operations are performed.

At step S11, the MPU 44 judges whether or not the received command is a write command. When it is not a write command, the control proceeds to step S7. When it is a write command, the control proceeds to step S12.

The bias magnet is moved to the erase state at step S12, the erase operation is performed at step S13, the bias magnet is moved to the write state at step S14, the write operation is performed at step S15, and then, the bias magnet is moved to the erase state at step S16. This state, the erase state is maintained.

When the operations of the second example shown in FIG. 16 are performed, steps S3 to S5 are added. At step S1, the MPU 44 sets the timer 46 to measure time.

At step S3, the MPU 44 judges whether or not the bias control is stopped. When the bias control is stopped, the control returns to step S2.

At step S2, the MPU 44 judges whether or not the timer 46 has measured the predetermined time duration t1. When the timer 46 has not measured the predetermined time duration t1, the control returns to step S2. When the timer 46 has measured the predetermined time duration t1, the control proceeds to step S5.

At step S5, the bias control is stopped and the timer 46 is reset. The control returns to step S2.

At step S2, when a command is received, the timer 46 is reset.

When the operations of the third example shown in FIG. 17 are performed, steps S8 to S10 are added. FIG. 22 shows the detailed operations at steps S9 and S10.

When it is judged that the received command is a read command at step S6, the control proceeds to step S8.

At step S8, the bias control is stopped, then, the control proceeds to step S32.

At step S31, according to an instruction from the MPU 44 the positioning controller 47 controls the positioner 26 so that the head is moved to the target track.

At step S32, the process waits until the head seek operation is finished.

At step S33, the read operation is performed.

At step S34, the MPU 44 informs the host computer of the completion of the read operation.

At step S35, the bias magnet is moved to the erase state. Then, the control returns to step S1.

When the operations of the fourth example shown in FIG. 18 is performed, steps S8 to S10 are added. FIG. 23 shows the detailed operations at steps S9 and S10.

When it is judged that the received command is a read command at step S6, the control proceeds to step S8.

At step S8, the bias control is stopped and the control proceeds to step S41.

At step S41, according to an instruction from the MPU 44, the position controller 47 controls the positioner 26 so that the head is moved to the target track.

At step S42, the process waits until the head seek operation is finished.

At step S43, the read operation is performed.

At step S44, the bias magnet is moved to the erase state.

At step S45, the MPU 44 informs the host computer of the completion of the read operation. Then, the control returns to step S1.

When the operations of the fifth example shown in FIG. 19 is performed, steps S8 to S10 are added. FIG. 24 shows the detailed operations at steps S9 and S10.

When it is judged that the received command is a read command at step S6, the control proceeds to step S8.

At step S8, the bias control is stopped, then, the control proceeds to step S51.

At step S51, according to an instruction from the MPU 44, the positioning controller 47 controls the positioner 26 so that the head is moved to the target track.

At step S52, the process waits until the head seek operation is finished.

At step S53, the read operation is started. The MPU 44 initializes the timer 46.

At step S54, with the read operation, the MPU 44 detects whether or not the value of the timer exceeds the predetermined value Td. The control proceeds to step S55 when the value of the timer does not exceed the predetermined value Td but the control proceeds to step S56 when the value of the timer exceeds the predetermined value Td.

At step S55, it is judged whether or not the read operation is finished. When the read operation is not finished the control returns to step S54. When the read operation is finished, the control proceeds to step S57.

At step S56, the bias magnet is moved to the erase state. The control proceeds to step S57.

At step S57, the MPU 44 informs the host computer of the completion of the read operation. Then, the control returns to step S1.

Figure 25:
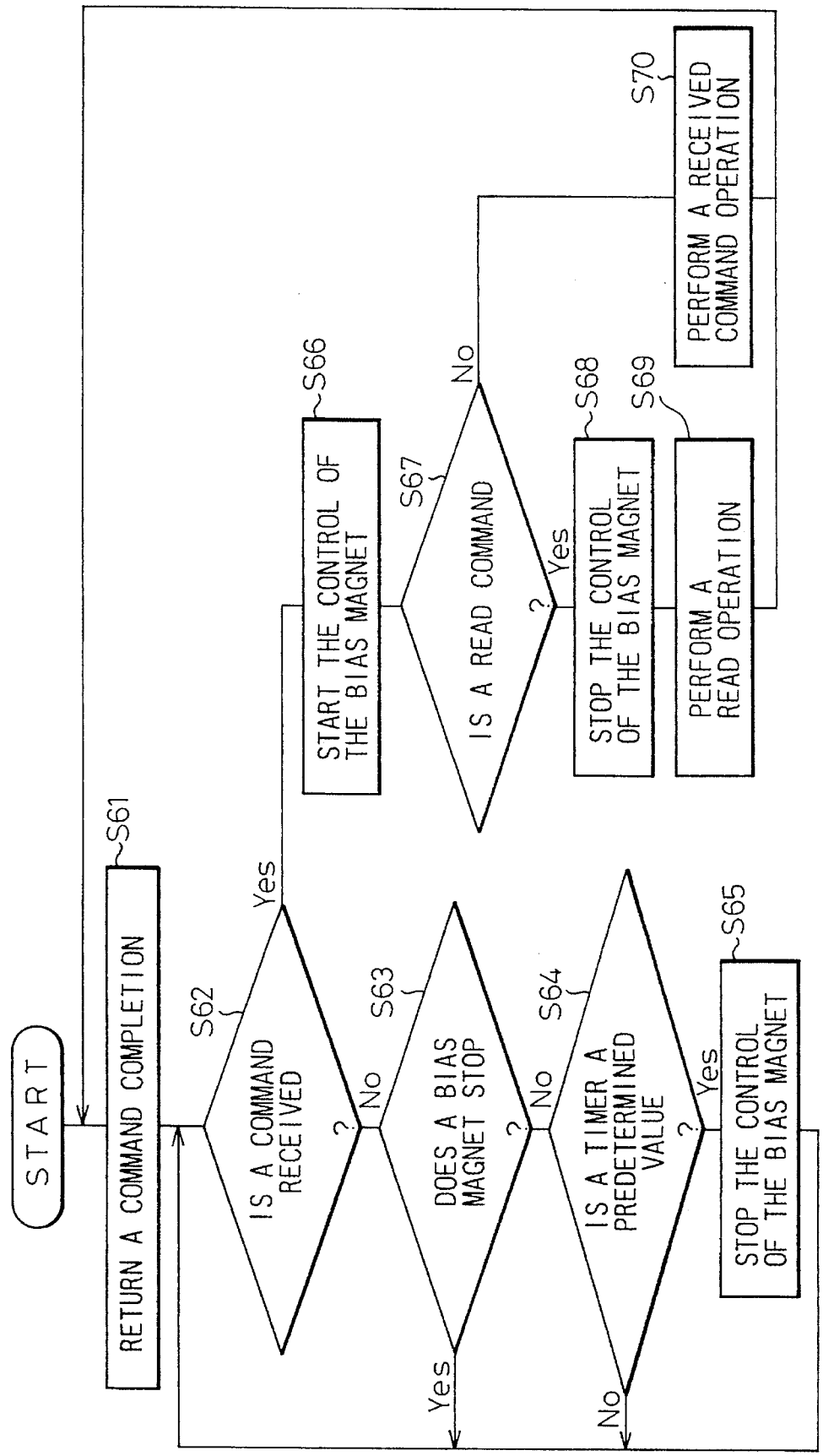

FIG. 25 shows the operations of the sixth example shown in FIG. 20.

In the operation shown in FIG. 25, steps S61 to S65 are same as steps S1 to S5 shown in FIG. 21. Therefore, explanations regarding these operations are omitted.

At step S62, the MPU 44 receives a command when the bias control is stopped. The control proceeds to step S66.

At step S66, the bias control is started.

At step S67, it is judged whether or not the received command is a read command. When the received command is a read command, the bias control is stopped again at step S68, and the read operation is performed at step S69. When the received command is not a read command, operations corresponding to the command are performed without stopping the bias control at step S70.

Although only a few embodiments of the present invention have been described. However, many modifications are possible.

For example, in the above embodiments, examples are shown in which the bias magnet is realized as a permanent magnet, however, the the bias magnet can be realized as an electromagnet. When an electromagnet is used, a relatively long time is necessary to set up the bias magnetic field. The bias set up time is determined by an inductance of a coil of the electromagnet. Therefore, the present invention is effective when an electromagnet is used to realize the bias magnet.

The E²PROM shown in FIG. 14 can be replaced with another rewritable nonvolatile memory such as a battery-maintained SRAM.

The present invention can also be applied to an apparatus or a method in which no verify operation is performed.

When data is written to areas in which data is not written, for example, virgin areas or areas whose data is already erased, the write operations need no erase operation. In this case, a control bit in the write command indicates that no erase operation is required. Therefore, when this type control bit is detected in the write command, the bias magnetic field is set to the write state after the completion of the write operation.

As described above, according to the present invention, the time for data writing can be reduced. Further, because the application of the bias magnetic field is stopped when it is unnecessary, power consumption can be reduced.

What is claimed is:

1. A rewritable storage apparatus which, when new data is recorded in an area on a medium, performs an erase operation to erase data recorded in said area by applying a second bias magnetic field for data erasing to said area then performs a record operation to record said new data by applying a first bias magnetic field for data recording to said area, comprising:

a bias application unit for applying said bias magnetic field to said medium, said bias magnetic field being switchable between said first bias magnetic field and said second bias magnetic field; and a bias control means for controlling said bias application unit so that said second bias magnetic field for data erasing is applied to said medium directly after said record operation is finished and said second bias magnetic field for data erasing is maintained.

2. A rewritable storage apparatus as set forth in claim 1, comprising:

read/write means for performing a data read operation and a data record operation to said medium; and control means for controlling said read/write means according to instructions from a host computer;

said bias application unit including:

a permanent magnet unit which is movable between two positions, said permanent magnet unit applying said first bias magnetic field when said permanent magnet unit is positioned at one of said two positions, and said permanent magnet unit applying said second bias magnetic field when said permanent magnet unit is positioned at the other of said two positions: and moving means for moving said permanent magnet unit between said two positions.

3. A rewritable storage apparatus as set forth in claim 1, comprising:

a read/write means for performing a data read operation and a data record operation to said medium; and a control means for controlling said read/write means according to instructions from a host computer; and bias magnetic field application unit including:

an electromagnet which switches a bias magnetic field between said first bias magnetic field and said second bias magnetic field by changing a current direction.

4. A rewritable storage apparatus which, when new data is recorded in an area on an optically recording medium, performs an erase operation to erase data recorded in said area by applying a second bias magnetic field for data erasing to said area then performs a record operation to record said new data by applying a first bias magnetic field for data recording to said area, comprising:

an optical head mechanism for projecting a laser beam onto an area on said optically recording medium;

a bias application unit for applying said bias magnetic field to said medium, said bias magnetic field being switchable between said first bias magnetic field and said second bias magnetic field; and a bias control means for controlling said bias application unit so that said second bias magnetic field for data erasing is applied to said medium directly after said record operation is finished and said second bias magnetic field for data erasing is maintained.

5. A rewritable storage apparatus as set forth in claim 4, comprising:

read/write means for performing a data read operation and a data record operation to said medium; and control means for controlling said read/write means according to instructions from a host computer;

said bias application unit including:

a permanent magnet unit which is movable between two positions, said permanent magnet unit applying said first bias magnetic field when said permanent magnet unit is positioned at one of said two positions, and said permanent magnet unit applying said second bias magnetic field when said permanent magnet unit is positioned at the other of said two positions; and moving means for moving said permanent magnet unit between said two positions.

6. A rewritable storage apparatus as set forth in claim 4, comprising:

a read/write means for performing a data read operation and a data record operation to said medium; and a control means for controlling said read/write means according to instructions from a host computer; and bias magnetic field application unit including:

an electromagnet which switches a bias magnetic field between said first bias magnetic field and said second bias magnetic field by changing a current direction.

7. A bias control method for a rewritable storage apparatus which records data by applying a first bias magnetic field for data recording and which erases data by applying a second bias magnetic field for data erasing, comprising:

when recording new data in an area on a medium in which data was already recorded, applying said second bias magnetic field to said area to perform an erase operation to erase data recorded in said area;

applying said first bias magnetic field to said area to perform a record operation to record said new data; and applying said second bias magnetic field to said medium directly after said record operation is finished, and maintaining the application of said second bias magnetic field.

8. A bias control method as set forth in claim 7, further comprising:

stopping said application of said second bias magnetic field when said rewritable storage apparatus receives no command from a host computer for a first predetermined time period after said rewritable storage apparatus informs said host computer of the completion of said new data record operation.

9. A bias control method as set forth in claim 7, further comprising:

stopping said application of said second bias magnetic field when said rewritable storage apparatus receives a read command from a host computer after said rewritable storage apparatus informs said host computer of the completion of said new data record operation.

10. A bias control method as set forth in claim 9, further comprising:

storing control information for said first bias magnetic field and said second bias magnetic field when said application of said second bias magnetic field is stopped;

reporting the completion of said read command when an operation indicated by said read command is finished; and setting said first bias magnetic field and said second bias magnetic field to a same state as when said read command was received according to said stored control information.

11. A bias control method as set forth in claim 9, further comprising:

storing bias control information for said first bias magnetic field and said second bias magnetic field when said application of said second bias magnetic field is stopped; and setting said first bias magnetic field and said second bias magnetic field to a same state as when said read command was received according to said stored control information directly after an operation indicated by said read command is finished.

12. A bias control method as set forth in claim 9, further comprising:

storing control information for said first bias magnetic field and said second bias magnetic field when said application of said second bias magnetic field is stopped; and setting said first bias magnetic field and said second bias magnetic field to a same state as when said read command was received according to said stored control information after a predetermined time from when said read command is received.

13. A bias control method as set forth in claim 12, wherein said predetermined time is calculated from parameters for said read command and from information previously stored in said rewritable storage apparatus.

14. A bias control method as set forth in claim 9, further comprising:

storing control information for said first bias magnetic and said second bias magnetic field when said application of said second bias magnetic field is stopped; and setting said first bias magnetic field and said second bias magnetic field to a same state as when said rewritable storage apparatus received said read command from a host computer alter said rewritable storage apparatus informs said host computer of the completion of said data read operation.

* * * * *

UNITED STATES PATENT AND TRADEMARK OFFICE
CERTIFICATE OF CORRECTION

PATENT NO. : 5,590,096

DATED : December 31, 1996

INVENTOR(S) : Ohtsuka et al.

It is certified that error appears in the above-indentified patent and that said Letters Patent is hereby corrected as shown below:

Column 4, line 41, delete "2." and insert --4.--.

Column 6, line 47, delete "fixed optical unit 15" and insert --fixed optical unit 14--.

Column 8, line 22, delete "FIG. 12" and insert --FIG. 14--.

Column 8, line 23, delete "FIG. 12," and insert --FIG. 14,--.

Column 8, line 26, delete "memory;" and insert --memory; 42--.

UNITED STATES PATENT AND TRADEMARK OFFICE
CERTIFICATE OF CORRECTION

PATENT NO. : 5,590,096
DATED : December 31, 1996
INVENTOR(S) : Ohtsuka et al.

It is certified that error appears in the above-indentified patent and that said Letters Patent is hereby corrected as shown below:

Column 8, line 28, delete "(MPU);" and insert

--(MPU); 45--.

Column 8, line 59, delete "25" and insert --45--.

Column 9, line 32, after "setting unit", insert --48.--.

Column 13, line 7, delete "Be=512" and insert

--Se=512--.

Column 14, line 22, delete "S2," and insert --S4,--.

Column 18, line 55, delete "alter" and insert -- after --.

Signed and Sealed this

Sixteenth Day of September, 1997

Attest:

BRUCE LEHMAN

Attesting Officer    Commissioner of Patents and Trademarks